US010440074B2

(12) United States Patent  
Sasaki et al.

(10) Patent No.: US 10,440,074 B2  
(45) Date of Patent: Oct. 8, 2019

(54) SYSTEM, INFORMATION PROCESSING APPARATUS, AND INFORMATION PROCESSING METHOD

(71) Applicants: Tohru Sasaki, Kanagawa (JP); Hiroaki Ikkanzaka, Saitama (JP)

(72) Inventors: Tohru Sasaki, Kanagawa (JP); Hiroaki Ikkanzaka, Saitama (JP)

(73) Assignee: RICOH COMPANY, LTD., Tokyo (JP)

(*) Notice: Subject to any disclaimer, the term of this patent is extended or adjusted under 35 U.S.C. 154(b) by 270 days.

(21) Appl. No.: 15/456,945

(22) Filed: Mar. 13, 2017

(65) Prior Publication Data

US 2017/0272480 A1  Sep. 21, 2017

(30) Foreign Application Priority Data

Mar. 17, 2016 (JP) .................................. 2016-053557  
Dec. 26, 2016 (JP) .................................. 2016-251144

(51) Int. Cl.  
*G06F 15/16* (2006.01)  
*H04L 29/06* (2006.01)  
(Continued)

(52) U.S. Cl.  
CPC .......... *H04L 65/4053* (2013.01); *G06F 21/10* (2013.01); *G06F 21/31* (2013.01);  
(Continued)

(58) Field of Classification Search  
CPC . H04L 12/1818; H04L 12/1822; H04L 63/08; H04L 65/403; H04N 7/15; G06F 21/31  
(Continued)

(56) References Cited

U.S. PATENT DOCUMENTS 8,931,066 B2 * 1/2015 Sakamoto ............. G06F 21/604  
                                                          726/4  
2006/0227143 A1   10/2006 Maita et al.  
(Continued)

FOREIGN PATENT DOCUMENTS

EP          1793582 A2     6/2007  
JP       2004-259161       9/2004  
(Continued)

OTHER PUBLICATIONS

Extended European Search Report dated Jul. 21, 2017.

*Primary Examiner* — Wing F Chan  
*Assistant Examiner* — Andrew Woo  
(74) *Attorney, Agent, or Firm* — Harness, Dickey & Pierce, P.L.C.

(57) ABSTRACT

An information processing apparatus that can be connected to information terminals and a data storage device through a network, and includes: a storage request receiver that receives conference identification information, information terminal identification information for a user participating in the conference, conference material data, and a storage request of the conference material data; an authentication program generator that generates an authentication program for determining whether the conference material data is capable of being transmitted to any of the information terminals when the conference material data is transmitted to the information terminal based on correspondence information in which pieces of the information terminal identification information are at least correlated with respective pieces of conference identification information, in accordance with the storage request; and a storage controller that stores the conference material data contained in the storage request and the authentication program in the data storage device in a correlated manner.

6 Claims, 20 Drawing Sheets

(51) Int. Cl.
  *G06F 21/10*    (2013.01)
  *G06F 21/31*    (2013.01)
  *G06F 21/44*    (2013.01)
  *G06Q 10/10*    (2012.01)
  *H04N 1/32*     (2006.01)
  *H04N 1/44*     (2006.01)
  *H04N 7/15*     (2006.01)

(52) U.S. Cl.
  CPC ........... *G06F 21/44* (2013.01); *G06Q 10/109* (2013.01); *H04L 63/123* (2013.01); *H04L 63/126* (2013.01); *H04N 1/32101* (2013.01); *H04N 1/444* (2013.01); *H04N 1/4413* (2013.01); *H04N 7/15* (2013.01); *H04N 2201/0087* (2013.01); *H04N 2201/3205* (2013.01); *H04N 2201/3219* (2013.01); *H04N 2201/3221* (2013.01); *H04N 2201/3226* (2013.01); *H04N 2201/3274* (2013.01); *H04N 2201/3278* (2013.01)

(58) Field of Classification Search
  USPC ...................................................... 709/204
  See application file for complete search history.

(56) References Cited

U.S. PATENT DOCUMENTS

| | | |
|---|---|---|
| 2006/0259755 A1 | 11/2006 | Kenoyer |
| 2009/0300529 A1 | 12/2009 | Endoh et al. |
| 2011/0169910 A1 | 7/2011 | Khot et al. |
| 2012/0144329 A1 | 6/2012 | Sasaki |
| 2013/0329253 A1 | 12/2013 | Sasaki |
| 2014/0090024 A1 | 3/2014 | Sakamoto |
| 2014/0150059 A1* | 5/2014 | Uchida .............. H04L 63/08 726/3 |
| 2015/0341441 A1 | 11/2015 | Saitoh et al. |
| 2016/0212114 A1 | 7/2016 | Kuroyanagi et al. |
| 2017/0272480 A1 | 9/2017 | Sasaki et al. |

FOREIGN PATENT DOCUMENTS

| | | |
|---|---|---|
| JP | 2017-041032 A | 2/2017 |
| JP | 2017-174396 A | 9/2017 |

* cited by examiner

FIG.4

| CONFER-ENCE ID | CONFERENCE NAME | CONFERENCE PLACE | USER ID | Mac ADDRESS | STATUS |
|---|---|---|---|---|---|
| ... | ... | ... | ... | ... | ... |
| 0013 | REGULAR CONFERENCE | CONFERENCE ROOM 301 ON 3RD FLOOR OF BUILDING A | Yoshida | 32:61:3C:4E:B6:05 | ENDED |
| 0013 | REGULAR CONFERENCE | CONFERENCE ROOM 301 ON 3RD FLOOR OF BUILDING A | Kimura | 33:61:3C:4E:B6:05 | ENDED |
| 0014 | DESIGN REVIEW | CONFERENCE ROOM 702 ON 7TH FLOOR OF BUILDING C | Sasaki | 34:61:3C:4E:B6:05 | IN INTERRUPTION |
| 0014 | DESIGN REVIEW | CONFERENCE ROOM 702 ON 7TH FLOOR OF BUILDING C | Satoh | 35:61:3C:4E:B6:05 | IN INTERRUPTION |
| 0014 | DESIGN REVIEW | CONFERENCE ROOM 702 ON 7TH FLOOR OF BUILDING C | Takahashi | 36:61:3C:4E:B6:05 | IN INTERRUPTION |
| 0014 | DESIGN REVIEW | CONFERENCE ROOM 702 ON 7TH FLOOR OF BUILDING C | Yamada | 37:61:3C:4E:B6:05 | IN INTERRUPTION |
| 0015 | INTERVIEW AT END OF TERM | CONFERENCE ROOM 203 ON 2ND FLOOR OF BUILDING D | Hayashi | 38:61:3C:4E:B6:05 | IN CONFERENCE |
| 0015 | INTERVIEW AT END OF TERM | CONFERENCE ROOM 203 ON 2ND FLOOR OF BUILDING D | Suzuki | 39:61:3C:4E:B6:05 | IN CONFERENCE |
| 0016 | INTERVIEW AT BEGINNING OF TERM... | CONFERENCE ROOM 203 ON 2ND FLOOR OF BUILDING D | Hayashi | 38:61:3C:4E:B6:05 | IN INTERRUPTION |
| ... | ... | ... | ... | ... | ... |

| IDENTIFICATION NUMBER N | AUTHENTICATION PROGRAM IDENTIFICATION INFORMATION | CONFERENCE MATERIAL DATA IDENTIFICATION INFORMATION |
|---|---|---|
| 001 | xyz-1 | abcdefg |
| 002 | xyz-2 | abcdhij |
| ⋮ | ⋮ | ⋮ |

| CONFERENCE ID | CONFERENCE NAME | CONFERENCE PLACE |
|---|---|---|
| 0013 | REGULAR CONFERENCE | CONFERENCE ROOM 301 ON 3RD FLOOR OF BUILDING A |
| 0014 | DESIGN REVIEW | CONFERENCE ROOM 702 ON 7TH FLOOR OF BUILDING C |
| 0015 | INTERVIEW AT END OF TERM | CONFERENCE ROOM 203 ON 2ND FLOOR OF BUILDING D |

SYSTEM, INFORMATION PROCESSING APPARATUS, AND INFORMATION PROCESSING METHOD

CROSS-REFERENCE TO RELATED APPLICATIONS

The present application claims priority under 35 U.S.C. § 119 to Japanese Patent Application No. 2016-053557, filed on Mar. 17, 2016 and Japanese Patent Application No. 2016-251144, filed on Dec. 26, 2016. The contents of which are incorporated herein by reference in their entirety.

BACKGROUND OF THE INVENTION

1. Field of the Invention

The present invention relates to a system, an information processing apparatus, and an information processing method.

2. Description with Reference to the Related Art

Conventionally, systems (conference systems) connecting office apparatuses (projectors, MFPs/LPs, intelligence whiteboards, and the like) in a close space and user terminals (PCs, smartphones, tablets, and the like) through a network have been known.

For example, Japanese Unexamined Patent Application Publication No. 2004-259161 discloses a technique of creating an information shared space for conference participants in a shared server on the Internet when a conference is started.

When, for example, the conference is interrupted, it is desired from the viewpoint of security that the following operation is performed. That is, an organizer of the conference (conference organizer) downloads conference material data indicating a material to be used for the conference onto a terminal (for example, a smartphone) that the organizer himself (herself) operates and manages it, and uploads the conference material data onto a conference system when the conference is restarted.

There is however an anxiety in terms of security when the conference organizer transmits the conference material data to another conference participant (substitute organizer) by email or using common file storage service in the case in which the conference organizer becomes incapable of participating in the conference for a sudden reason such as a poor physical condition and a traffic situation at the time of restart of the conference. Accordingly, the conventional technique cannot take over the conference material data that the conference organizer manages to another conference participant while sufficiently ensuring security, resulting in a problem.

SUMMARY OF THE INVENTION

According to exemplary embodiments of the present invention, there is provided a system including a plurality of information terminals, an information processing apparatus, and a data storage device that are capable of being connected to one another through a network, the system comprising: a correspondence information storage unit configured to store therein correspondence information in which a plurality of pieces of information terminal identification information for identifying the information terminals corresponding to a plurality of users participating in conferences in a one-to-one manner are at least correlated with respective pieces of conference identification information for identifying the conferences; a storage request receiver configured to receive the conference identification information, the information terminal identification information, conference material data to be used for a conference, and a storage request requesting storage of the conference material data in the data storage device from any of the information terminals; an authentication program generator configured to generate an authentication program for determining whether the conference material data stored in the data storage device is capable of being transmitted to any of the information terminals when the conference material data is transmitted to the information terminal based on the correspondence information stored in the correspondence information storage unit in accordance with the storage request received by the storage request receiver; and a storage controller configured to store the conference material data received by the storage request receiver and the authentication program generated by the authentication program generator in the data storage device in a correlated manner.

Exemplary embodiments of the present invention also provide an information processing apparatus that is capable of being connected to a plurality of information terminals and a data storage device through a network, the information processing apparatus comprising: a storage request receiver configured to receive conference identification information for identifying a conference, information terminal identification information for identifying an information terminal that a user participating in the conference possesses, conference material data to be used for the conference, and a storage request requesting storage of the conference material data in the data storage device from any of the information terminals; an authentication program generator configured to generate an authentication program for determining whether the conference material data stored in the data storage device is capable of being transmitted to any of the information terminals when the conference material data is transmitted to the information terminal based on correspondence information in which pieces of the information terminal identification information are at least correlated with respective pieces of conference identification information, in accordance with the storage request received by the storage request receiver; and a storage controller configured to store the conference material data contained in the storage request received by the storage request receiver and the authentication program generated by the authentication program generator in the data storage device in a correlated manner.

Exemplary embodiments of the present invention also provide an information processing method by a system including a plurality of information terminals, an information processing apparatus, and a data storage device that are capable of being connected to one another through a network, the information processing method comprising: receiving conference identification information for identifying a conference, information terminal identification information for identifying an information terminal that a user participating in the conference possesses, conference material data to be used for the conference, and a storage request requesting storage of the conference material data in the data storage device from any of the information terminals; generating an authentication program for determining whether the conference material data stored in the data storage device is capable of being transmitted to any of the information terminals when the conference material data is transmitted to the information terminal based on correspondence information in which pieces of the information terminal identification information are at least correlated with respective pieces of conference identification information, in accordance with the storage request received at the receiving; and storing the conference material data received at the receiving and the authentication program generated at the generating in the data storage device in a correlated manner.

BRIEF DESCRIPTION OF THE DRAWINGS

FIG. 4 is a diagram illustrating an example of correspondence information;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
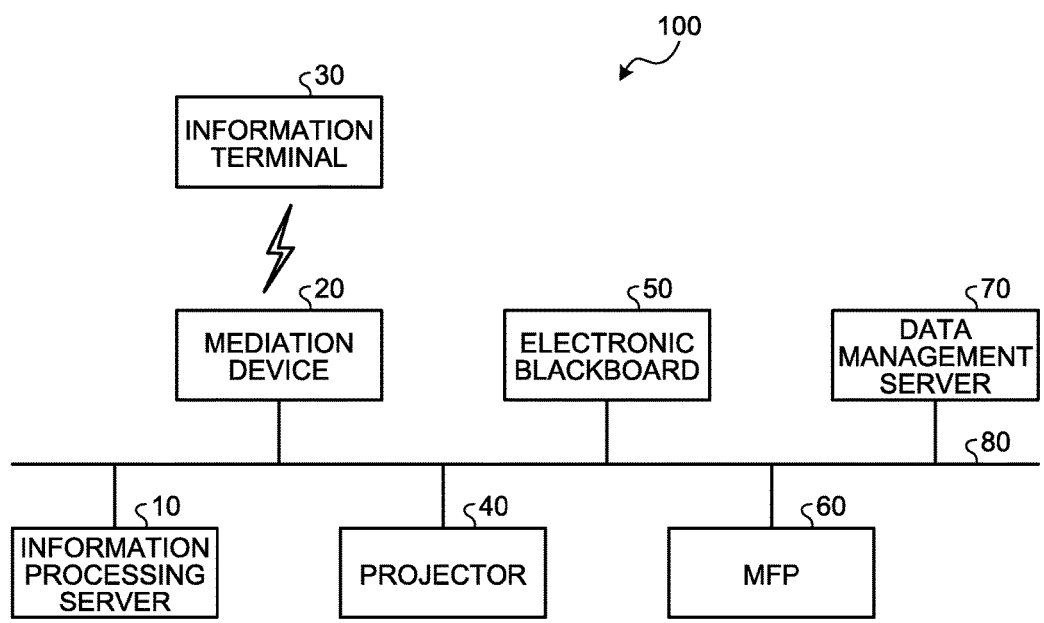
FIG. 1 is a diagram illustrating an example of the configuration of a system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments of a system, an information processing apparatus, and an information processing method according to the present invention will be described in detail with reference to the accompanying drawings.

FIG. 1 is a diagram illustrating an example of the configuration of a system 100 in the embodiment. The system 100 in the embodiment is constructed as a network conference system in a logically closed environment. As illustrated in FIG. 1, the system 100 includes an information processing server 10, a mediation device 20, an information terminal 30, a projector 40, an electronic blackboard 50, a multifunctional peripheral (MFP) 60, and a data management server 70. The information processing server 10, the mediation device 20, the projector 40, the electronic blackboard 50, the MFP 60, and the data management server 70 are connected to one another via a conference network 80 (hereinafter, simply referred to as "network 80"). The mediation device 20 is, for example, an access point and an area in which radio waves from the mediation device 20 reach is referred to as a "bordered area" in some cases. The mediation device 20 is a mediation unit for connecting the information terminal 30 (the information terminal 30 that a conference participant uses) present in the bordered area to the network 80 using a wireless communication technology such as Bluetooth (registered trademark) and WiFi (registered trademark).

Although FIG. 1 illustrates one information terminal 30 for the convenience of description, the number thereof is not limited to one and the desired number of information terminals 30 that are connected to the network 80 through the mediation device 20 may be provided. Although in the example of FIG. 1, the projector 40, the electronic blackboard 50, and the MFP 60 are exemplified as the apparatuses included in the system 100, the apparatuses are not limited thereto and types and the numbers of apparatuses included in the system 100 can be desirably changed.

Figure 2:
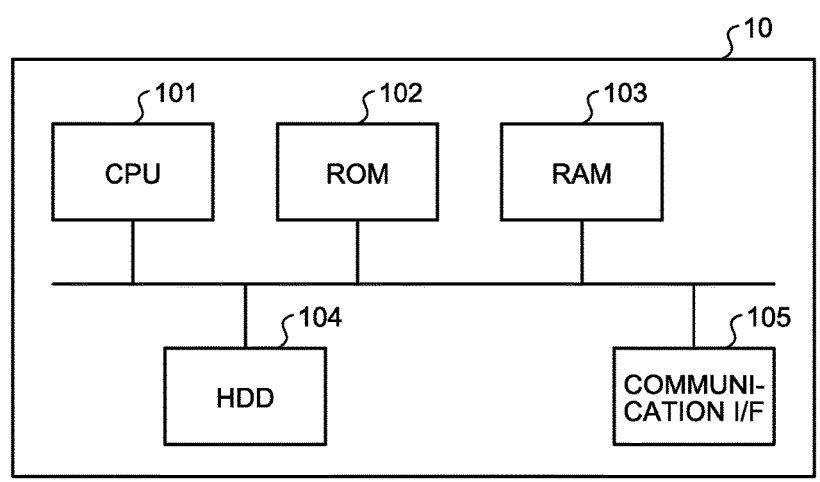
FIG. 2 is a diagram illustrating an example of the hardware configuration of an information processing server.

FIG. 2 is a diagram illustrating an example of the hardware configuration of the information processing server 10 as an example of the "information processing apparatus". As illustrated in FIG. 2, the information processing server 10 includes a central processing unit (CPU) 101, a read only memory (ROM) 102, a random access memory (RAM) 103, a hard disk drive (HDD) 104, and a communication I/F 105.

The CPU 101 is an arithmetic unit and collectively controls operations of the overall information processing server 10. The ROM 102 is a read-only non-volatile storage medium and stores therein programs such as firmware. The RAM 103 is a volatile storage medium from and into which information can be read and written at high speed and is used as a work region when the CPU 101 processes the information. The HDD 104 is a non-volatile storage medium from and into which information can be read and written and stores therein an operating system (OS) and various control programs, application programs, and the like. The communication I/F 105 is an interface for connecting the information processing server 10 to the network 80 and is, for example, a network interface card (NIC).

Figure 3:
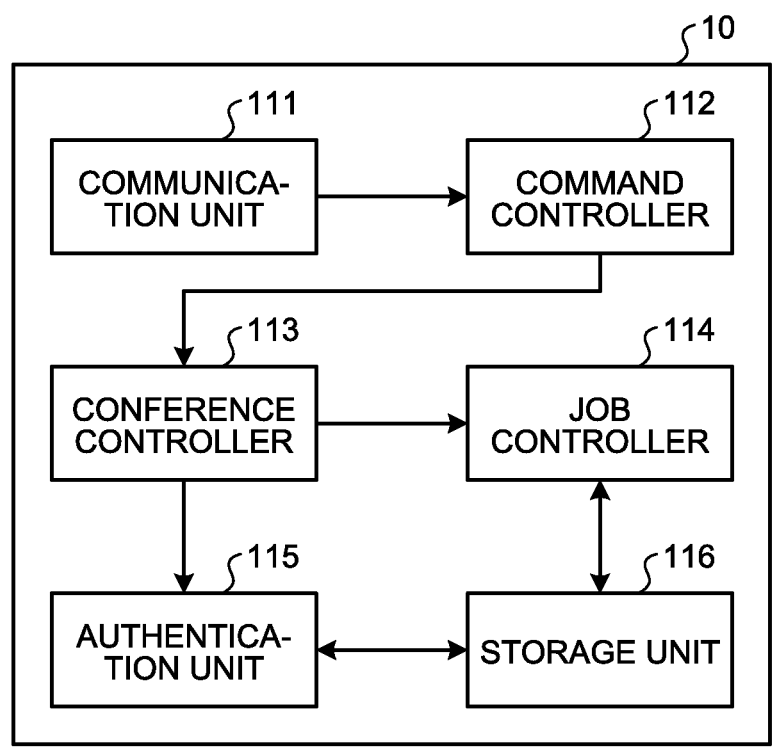
FIG. 3 is a diagram illustrating an example of functions of the information processing server.

FIG. 3 is a diagram illustrating an example of functions of the information processing server 10. As illustrated in FIG. 3, the information processing server 10 includes a communication unit 111, a command controller 112, a conference controller 113, a job controller 114, an authentication unit 115, and a storage unit 116.

The communication unit 111 makes communication with the information terminal 30 and the data management server 70. The command controller 112 interprets various requests (instructions) received by the communication unit 111 and converts them into control instructions in the information processing server 10. The conference controller 113 performs various controls related to the conference in accordance with the control instructions notified from the command controller 112. The job controller 114 executes various jobs in accordance with instructions by the conference controller 113. The authentication unit 115 performs authentication processing on a user (the information terminal 30) in conference management and generates an authentication program, which will be described later. Specific contents of these functions will be described with reference to the following sequence diagrams. The storage unit 116 stores therein various pieces of information.

In the embodiment, the storage unit 116 stores therein correspondence information in which a plurality of pieces of information terminal identification information for identifying the information terminals 30 corresponding to a plurality of users participating in conferences in a one-to-one manner are at least correlated with respective conference IDs (respective pieces of conference identification information) for identifying the conferences. FIG. 4 is a diagram illustrating an example of the correspondence information. Although the correspondence information is information in which conference names, conference places, user IDs for identifying the users participating in the conferences, Mac addresses of the information terminals 30 that the users operate, and statuses indicating states of the conferences are correlated with the respective conference IDs in the example of FIG. 4, the correspondence information is not limited thereto. In this example, combinations of the user IDs and the Mac addresses correspond to the pieces of information terminal identification information.

In this example, when the information processing server 10 receives a conference holding request containing the user ID, the Mac address, the conference name, and the conference place and requesting to hold a conference from the information terminal 30 of a conference organizer, it issues a new conference ID. The information processing server 10 notifies the information terminal 30 of the issued conference ID as a response to the conference holding request and registers, in the correspondence information, the conference ID, the user ID, the Mac address, the conference name, and the conference place contained in the conference holding request, and the status indicating "in preparation" in a correlated manner. The conference organizer informs other conference participant(s) of the conference ID notified from the information processing server 10. The other conference participant(s) performs an operation for transmitting a conference participation request containing at least the conference ID, the user ID, and the Mac address, and requesting to participate in the conference to the information processing server 10. The information processing server 10 checks whether the conference ID contained in the received conference participation request has been already registered in the correspondence information on reception of the conference participation request from the information terminal 30. When the conference ID has been already registered in the correspondence information, the information processing server 10 registers, in the correspondence information, the conference ID that has been already registered, the conference name, the conference place, and the status that have been already linked to the conference ID, and the user ID and the Mac address contained in the received conference participation request in a correlated manner. Thereafter, when the information processing server 10 receives a conference start request containing at least the conference ID and requesting to start the conference from the information terminal 30 of the conference organizer, it sets the status linked to the conference ID to "in conference". It should be noted that operation procedures of interruption and restart of the conference will be described later.

Although the functions (the communication unit 111, the command controller 112, the conference controller 113, the job controller 114, and the authentication unit 115) of the information processing server 10 are implemented when the CPU 101 executes programs stored in the ROM 102 and the like in the embodiment, they are not limited to be implemented in this manner. For example, at least a part of the functions of the information processing server 10 may be implemented by an exclusive hardware circuit. The above-mentioned storage unit 116 is implemented by, for example, the HDD 104.

Figure 5:
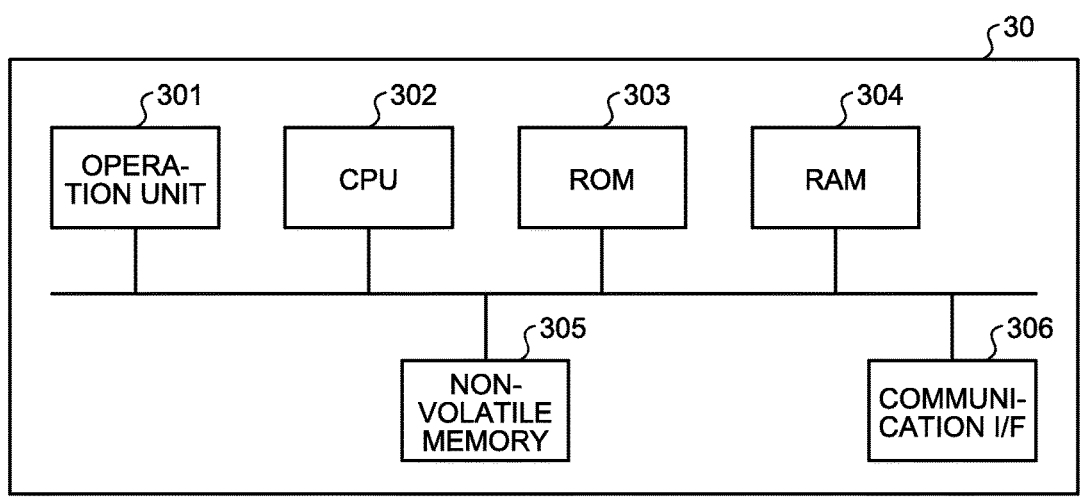
FIG. 5 is a diagram illustrating an example of the hardware configuration of an information terminal.

FIG. 5 is a diagram illustrating an example of the hardware configuration of the information terminal 30. As illustrated in FIG. 5, the information terminal 30 includes an operation unit 301, a CPU 302, a ROM 303, a RAM 304, a non-volatile memory 305, and a communication I/F 306.

The operation unit 301 is a device (device providing a graphical user interface (GUI)) for receiving operations by a user and displaying various pieces of information. The CPU 302 is an arithmetic unit and collectively controls operations of the overall information terminal 30. The ROM 303 is a read-only non-volatile storage medium and stores therein programs such as firmware. The RAM 304 is a volatile storage medium from and into which information can be read and written at high speed and is used as a work region when the CPU 302 processes the information. The non-volatile memory 305 is a non-volatile storage medium from and into which information can be read and written and stores therein an operating system (OS) and various control programs, application programs, and the like. The communication I/F 306 is an interface for connecting the information terminal 30 to the mediation device 20 and is, for example, a NIC.

Figure 6:
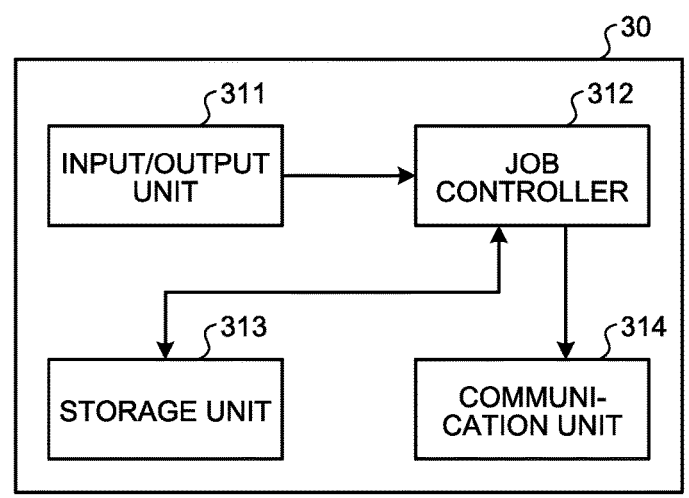
FIG. 6 is a diagram illustrating an example of functions of the information terminal.

FIG. 6 is a diagram illustrating an example of functions of the information terminal 30. As illustrated in FIG. 6, the information terminal 30 includes an input/output unit 311, a job controller 312, a storage unit 313, and a communication unit 314.

The input/output unit 311 is a user interface providing a function of receiving operations of the user, a function of displaying various types of screens, and the like. The job controller 312 causes an application for using a conference system to operate and executes various jobs. The storage unit 313 stores therein pieces of data (conference material data and the like in the case of the information terminal 30 of the conference organizer) to be held on the information terminal 30. The communication unit 314 makes communication with the information processing server 10 and the like through the mediation device 20.

Although the functions (the input/output unit 311, the job controller 312, and the communication unit 314) of the information terminal 30 are implemented when the CPU 302 executes programs stored in the ROM 303 and the like in the embodiment, they are not limited to be implemented in this manner. For example, at least a part of the functions of the information terminal 30 may be implemented by an exclusive hardware circuit. The above-mentioned storage unit 314 is implemented by, for example, the non-volatile memory 305.

Figure 7:
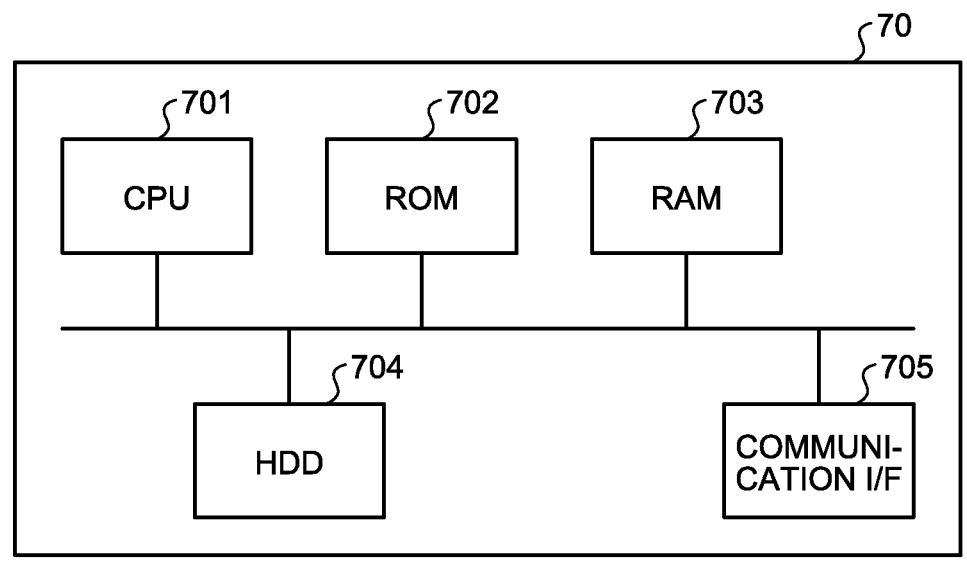
FIG. 7 is a diagram illustrating an example of the hardware configuration of a data management server.

FIG. 7 is a diagram illustrating an example of the hardware configuration of the data management server 70 as an example of a "data storage device". As illustrated in FIG. 7, the data management server 70 includes a CPU 701, a ROM 702, a RAM 703, an HDD 704, and a communication I/F 705.

The CPU 701 is an arithmetic unit and collectively controls operations of the overall data management server 70. The ROM 702 is a read-only non-volatile storage medium and stores therein programs such as firmware. The RAM 703 is a volatile storage medium from and into which information can be read and written at high speed and is used as a work region when the CPU 701 processes the information. The non-volatile memory 704 is a non-volatile storage medium from and into which information can be read and written and stores therein an operating system (OS) and various control programs, application programs, and the like. The communication I/F 705 is an interface for connecting the data management server 70 to the network 80 and is, for example, a NIC.

Figure 8:
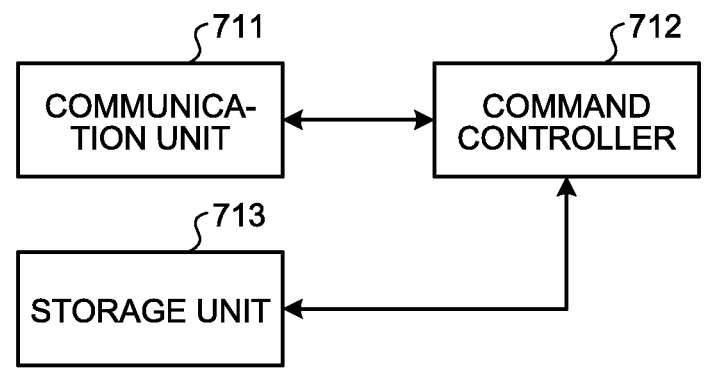
FIG. 8 is a diagram illustrating an example of functions of the data management server.

FIG. 8 is a diagram illustrating an example of functions of the data management server 70. As illustrated in FIG. 8, the data management server 70 includes a communication unit 711, a command controller 712, and a storage unit 713.

The communication unit 711 makes communication with the information processing server 10. The command controller 712 interprets various requests (instructions) received by the communication unit 711, converts them into control instructions in the information processing server 10, and executes the converted instructions. The storage unit 713 holds therein pieces of data to be held on the data management server 70.

Although the functions (the communication unit 711 and the command controller 712) of the data management server 70 are implemented when the CPU 701 executes programs stored in the ROM 702 and the like in the embodiment, they are not limited to be implemented in this manner. For example, at least a part of the functions of the data management server 70 may be implemented by an exclusive hardware circuit. The above-mentioned storage unit 713 is implemented by, for example, the HDD 704.

Figure 9:
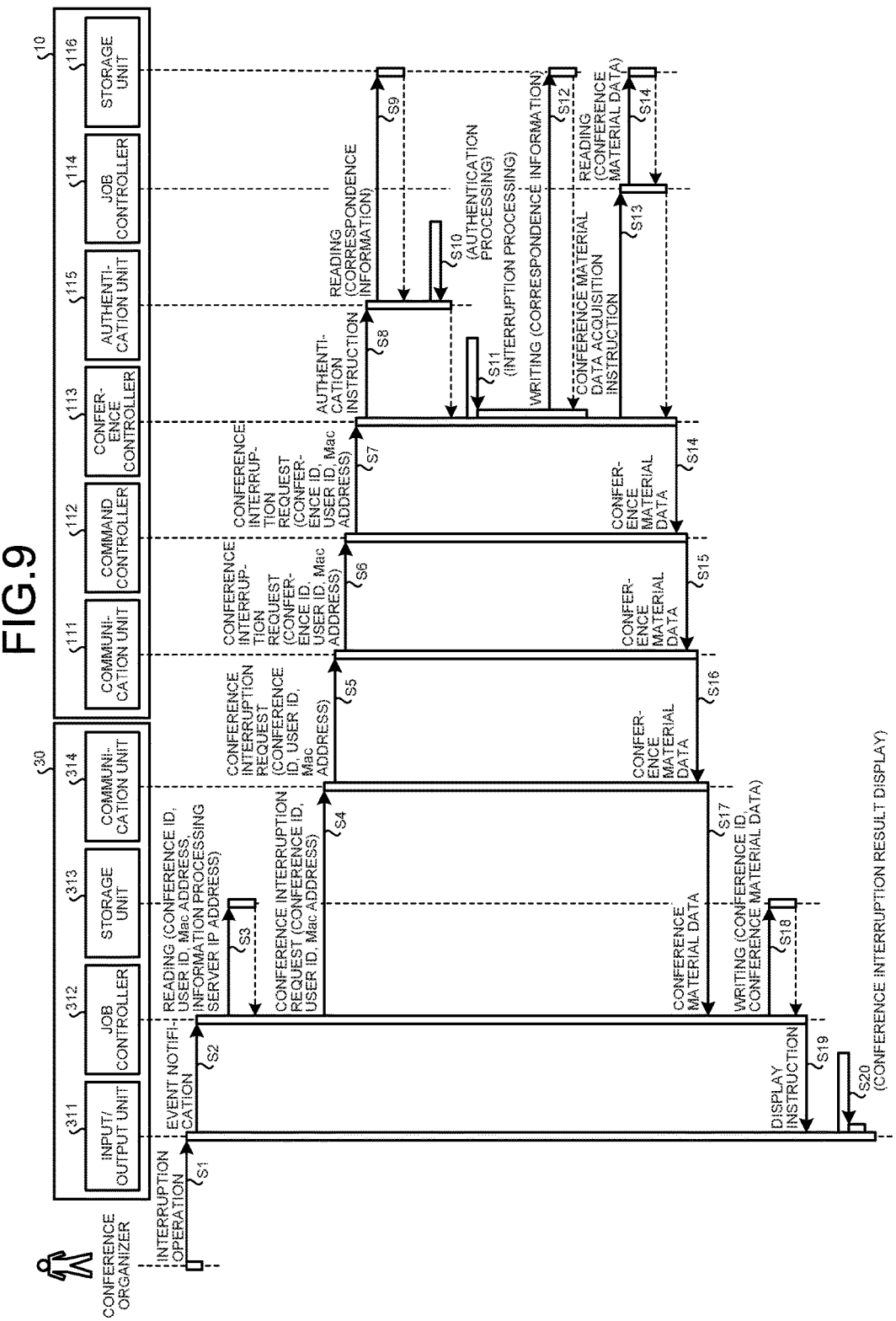
FIG. 9 is a sequence diagram illustrating an example of operation procedures of the system.
Figure 10:
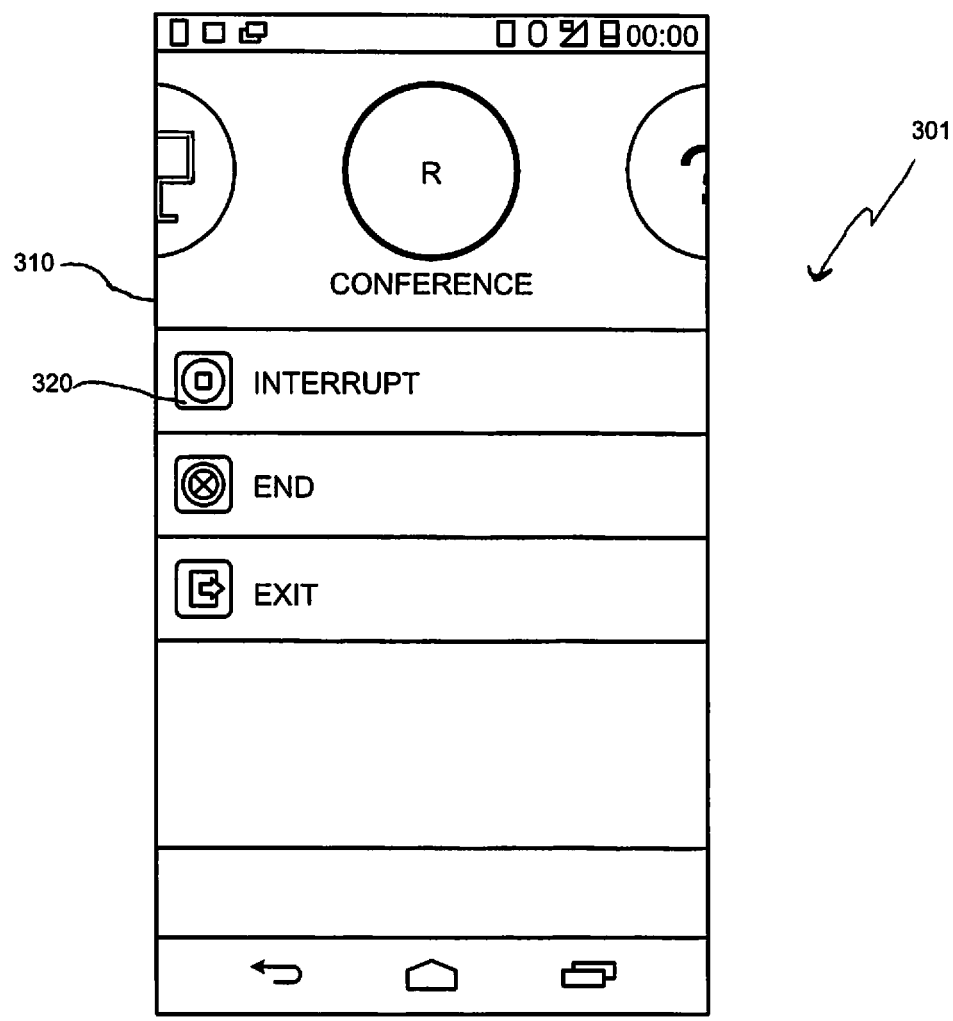
FIG. 10 is a diagram illustrating an example of a screen that is displayed on an operation unit.

FIG. 9 is a sequence diagram illustrating an example of operation procedures of the system 100 at the time of conference interruption. As illustrated in FIG. 9, the user as the conference organizer performs an operation of instructing the information terminal 30 that he (she) possesses to interrupt a conference (step S1). Although various modes can be considered as the operation, for example, the operation may be an operation of pressing a display component (UI) indicating "interrupt" (320 in FIG. 10) through an operation screen 310 that is displayed on the operation unit 301 as illustrated in FIG. 10.

Description with reference to FIG. 9 is continued. The input/output unit 311 that has received the above-mentioned operation at step S1 notifies the job controller 312 of a conference interruption event indicating generation of an event triggering interruption of the conference (step S2). The job controller 312 that has received the conference interruption event reads the conference ID, the user ID and the Mac address for identifying the own device, and an information processing server IP address indicating the location of the information processing server 10 on the network 80, these being stored in the storage unit 313 (step S3). In this example, the information terminal 30 receives notification of the information processing server IP address from the mediation device 20 when it is connected to the network 80 through the mediation device 20. In this example, the storage unit 313 of the information terminal 30 of the conference organizer stores therein the conference ID for identifying the conference that is being held, the user ID and the Mac address for identifying the own device, the information processing server IP address notified from the mediation device 20, and the like.

Then, the job controller 312 requests, from the communication unit 314, transmission of a conference interruption request containing the conference ID, the user ID, and the Mac address and requesting interruption of the conference to the information processing server 10 specified by the information processing server IP address (step S4). The communication unit 314 that has received the request transmits the above-mentioned conference interruption request to the information processing server 10 (step S5).

When the communication unit 111 of the information processing server 10 receives the above-mentioned conference interruption request from the information terminal 30, it transfers the received conference interruption request to the command controller 112 (step S6). The command controller 112 transfers the conference interruption request transferred from the communication unit 111 to the conference controller 113 (step S7). To be more specific, the command controller 112 interprets the conference interruption request transferred from the communication unit 111, converts it to a control instruction in the information processing server 10, and transfers it to the conference controller 113.

Subsequently, the conference controller 113 transfers the conference ID, the user ID, and the Mac address contained in the conference interruption request received from the command controller 112 to the authentication unit 115, and instructs the authentication unit 115 to execute authentication processing (step S8). The authentication unit 115 that has received the instruction reads the above-mentioned correspondence information from the storage unit 116 (step S9) and executes the authentication processing of determining whether a combination of the conference ID, the user ID, and the Mac address received from the conference controller 113 is present in the read correspondence information (step S10). When the combination of the conference ID, the user ID, and the Mac address received from the conference controller 113 is present in the read correspondence information, the information terminal 30 as a request source of the above-mentioned conference interruption request is authenticated (it is deemed to have right authority to request interruption). For the convenience of description, hereinafter, it is supposed that a result of the authentication processing at step S10 is positive. When the authentication processing is completed, the conference controller 113 executes interruption processing of interrupting the conference (step S11) and writes the correspondence information in which the corresponding status is changed to "in interruption" into the storage unit 116 (step S12).

Thereafter, the conference controller 113 instructs the job controller 114 to acquire conference material data (step S13). The job controller 114 that has received the instruction reads conference material data from the storage unit 116 (step S14) and transfers it to the conference controller 113. In this example, the job controller 114 transfers the read conference material data to the conference controller 113, and then, deletes the conference material data from the storage unit 116 in order not to leave the conference material data on the information processing server 10 after the interruption or closure of the conference in terms of security.

The conference controller 113 that has received the conference material data from the job controller 114 transmits the conference material data to the information terminal 30 through the command controller 112 and the communication unit 111 (step S14 to step S16).

Figure 11:
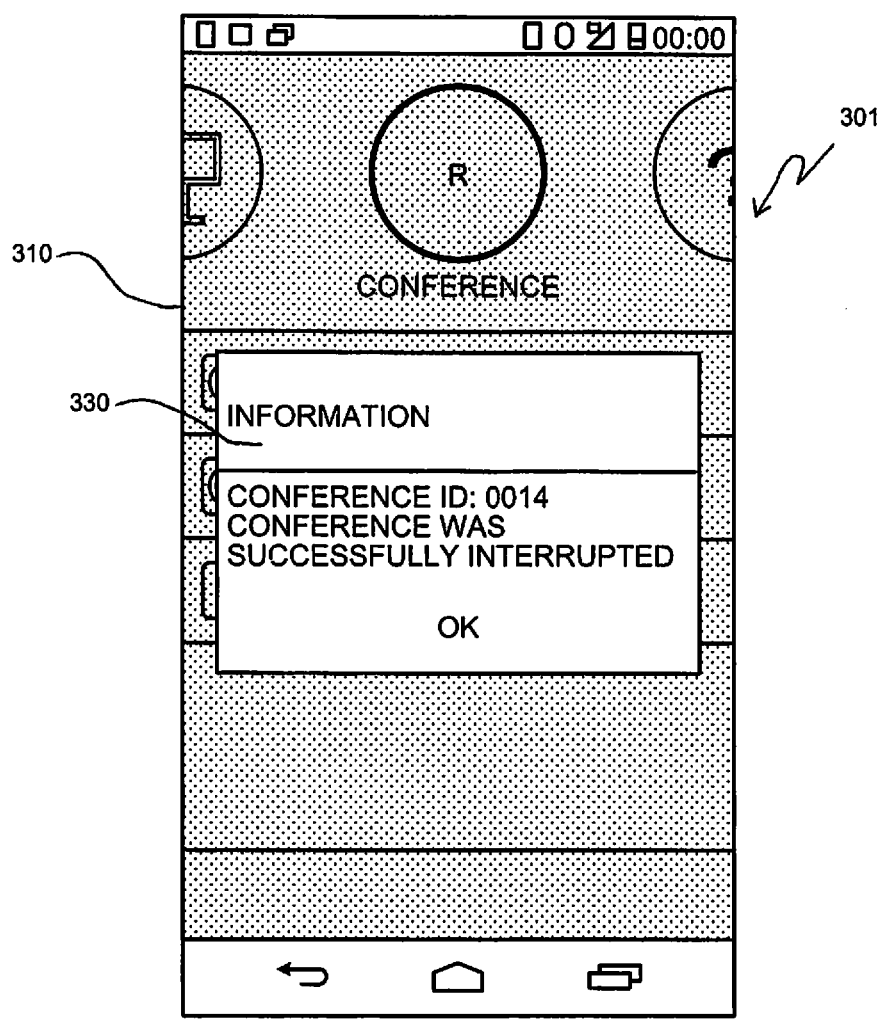
FIG. 11 is a diagram illustrating another example of the screen that is displayed on the operation unit.

When the communication unit 314 of the information terminal 30 receives the conference material data as a response to the conference interruption request from the information processing server 10, it transfers the received conference material data to the job controller 312 (step S17). The job controller 312 stores, in the storage unit 313, the conference material data received from the communication unit 314 and the conference ID of the conference that is interrupted in a linked manner (step S18). That is to say, in this example, when the conference is interrupted, the conference material data is stored in the information terminal 30 of the conference organizer without leaving the conference material data on the information processing server 10. Then, the job controller 312 instructs the input/output unit 311 to display a conference interruption result indicating completion of the conference interruption processing (step S19). The input/output unit 311 that has received this instruction displays an operation screen 310 indicating the conference interruption result 330, for example, as illustrated in FIG. 11 on the operation unit 301 (step S20).

Next, operation procedures when the conference is restarted will be described. Normally, the conference organizer performs an operation of restarting the conference that he (she) has interrupted. When, for example, the conference organizer however becomes incapable of participating in the conference for a sudden reason such as a poor physical condition and a traffic situation, the conference material data stored in the information terminal 30 of the conference organizer can be taken over to another conference participant (substitute organizer) to cause the conference participant to restart the conference. An example of operation procedures of the system 100 for taking over the conference material data will be described with reference to FIG. 12.

Figure 13:
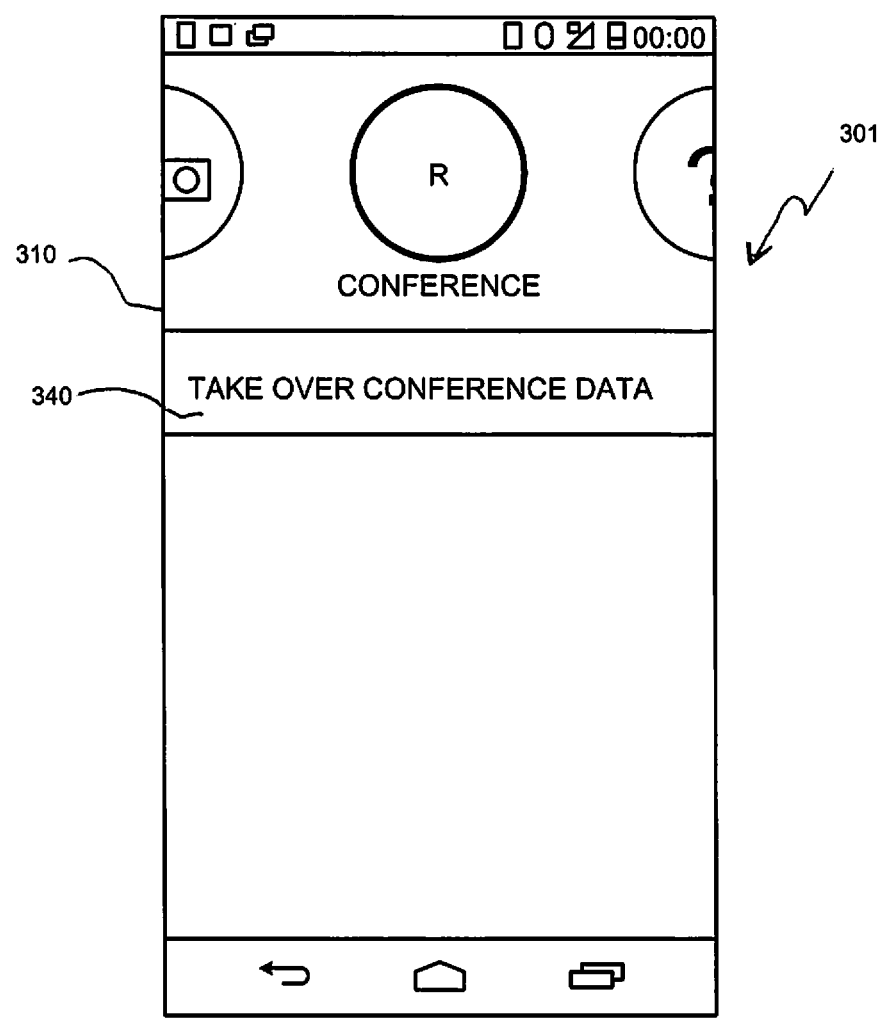
FIG. 13 is a diagram illustrating still another example of the screen that is displayed on the operation unit.
Figure 14:
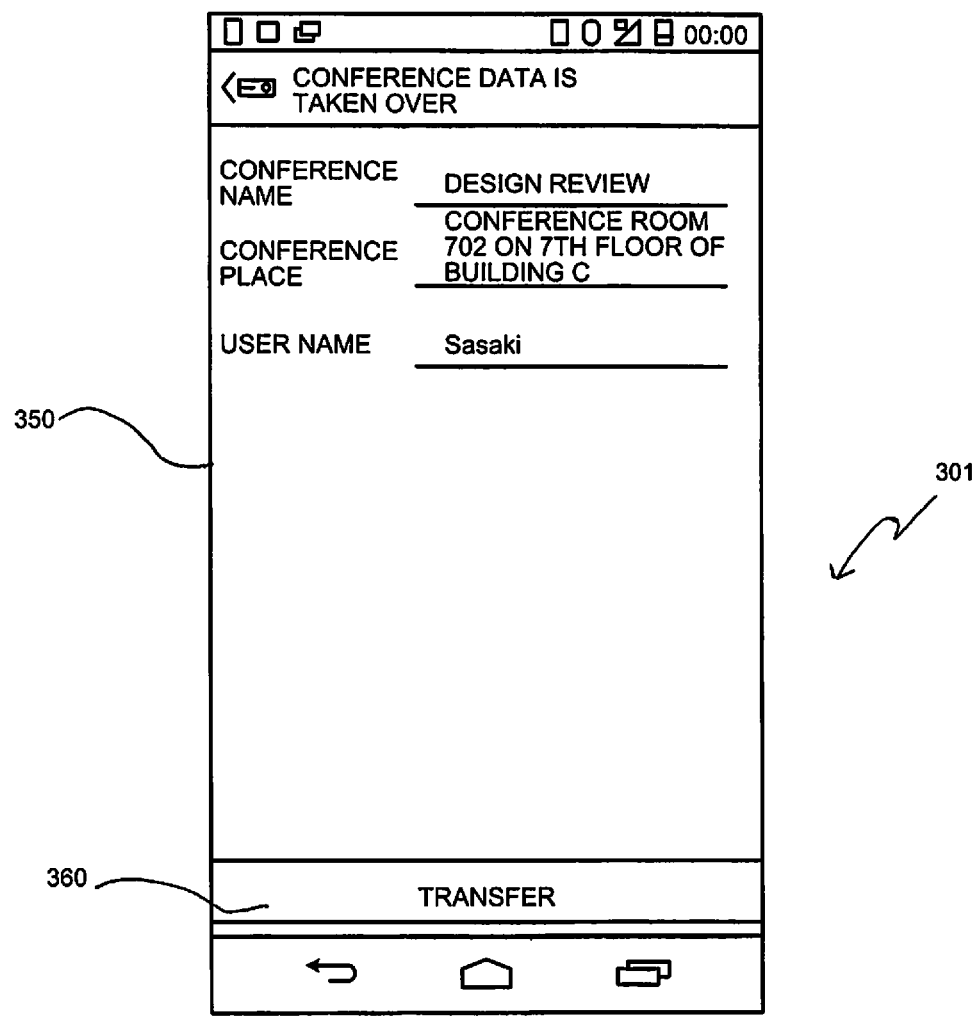
FIG. 14 is a diagram illustrating still another example of the screen that is displayed on the operation unit.

First, the conference organizer performs an operation of instructing the information terminal 30 that he (she) possesses to store (may be considered to "transfer") the conference material data stored in the information terminal 30 to the outside (in this example, the data management server 70) (step S21). Various modes can be considered as the operation. As an example, when pressing of a display component indicating "take over conference data" 340 is received through an operation screen 310 of operation unit 301 as illustrated in FIG. 13, the operation screen 310 transitions to a confirmation screen 350 of the operation unit 301 as illustrated in FIG. 14 and a display component indicating "transfer" 360 is pressed on the confirmation screen 350. This operation may be a mode corresponding to the operation at step S21.

Figure 12:
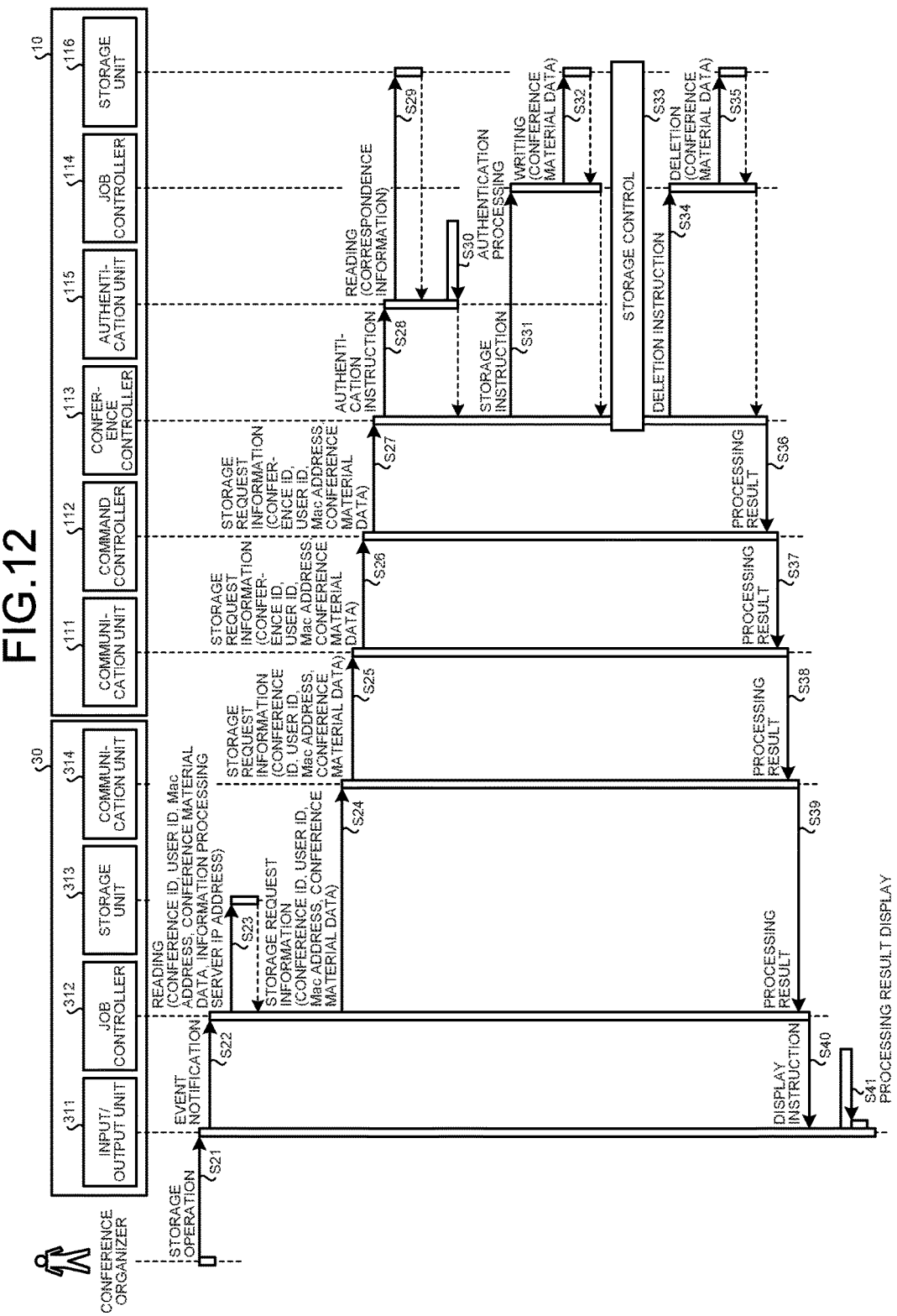
FIG. 12 is a sequence diagram illustrating an example of operation procedures of the system.

Description with reference to FIG. 12 is continued. The input/output unit 311 that has received the above-mentioned operation at step S21 notifies the job controller 312 of a file storage event (file transfer event) indicating generation of an event triggering storage (transfer) of the conference material data to the outside (step S22). The job controller 312 that has received the file storage event reads the conference ID, the user ID and the Mac address for identifying the own device, the conference material data, and the information processing server IP address, these being stored in the storage unit 313 (step S23). Then, the job controller 312 requests, from the communication unit 314, transmission of the conference ID, the user ID, the Mac address, the conference material data, and a storage request requesting storage of the conference material data in the data management server 70 to the information processing server 10 specified by the information processing server IP address (step S24). In the following description, the information group (the conference ID, the user ID, the Mac address, the conference material data, and the storage request) is referred to as "storage request information". The communication unit 314 that has received the request transmits the above-mentioned storage request information to the information processing server 10 (step S25).

When the communication unit 111 of the information processing server 10 receives the above-mentioned storage request information from the information terminal 30, it transfers the received storage request information to the command controller 112 (step S26). In this example, the communication unit 111 corresponds to a "storage request receiver". Then, the command controller 112 transfers the storage request information transferred from the communication unit 111 to the conference controller 113 (step S27). To be more specific, the command controller 112 interprets the storage request transferred from the communication unit 111, converts it to a control instruction in the information processing server 10, and transfers it to the conference controller 113.

Subsequently, the conference controller 113 transfers the conference ID, the user ID, and the Mac address contained in the storage request information received from the command controller 112 to the authentication unit 115, and instructs the authentication unit 115 to execute the authentication processing (step S28). The authentication unit 115 that has received the instruction reads the above-mentioned correspondence information from the storage unit 116 (step S29) and executes the authentication processing of determining whether a combination of the conference ID, the user ID, and the Mac address received from the conference controller 113 is present in the read correspondence information (step S30). When the combination of the conference ID, the user ID, and the Mac address received from the conference controller 113 is present in the read correspondence information, the information terminal 30 as a request source of the above-mentioned storage request is authenticated (it is deemed to have right authority to request storage of the conference material data). For the convenience of description, hereinafter, it is supposed that a result of the authentication processing at step S30 is positive. In this example, the authentication unit 115 has a function of authenticating the user ID and the Mac address (authenticating the information terminal identification information) when the combination of the conference ID, the user ID, and the Mac address contained in the storage request information received by the communication unit 111 is present in the correspondence information, and corresponds to an "authentication unit".

When the above-mentioned authentication processing is completed, the conference controller 113 specifies a file path indicating a storage destination of the conference material data in the storage unit 116 and the conference material data and instructs the job controller 114 to write the specified conference material data in order to temporarily store the conference material data contained in the storage request information in the information processing server 10 (step S31). The job controller 114 that has received the instruction writes the specified conference material data into the specified file path (step S32). In this example, the storage unit 116 has a function of temporarily storing the conference material data contained in the above-mentioned storage request information and corresponds to a "conference material data storage unit".

Figure 15:
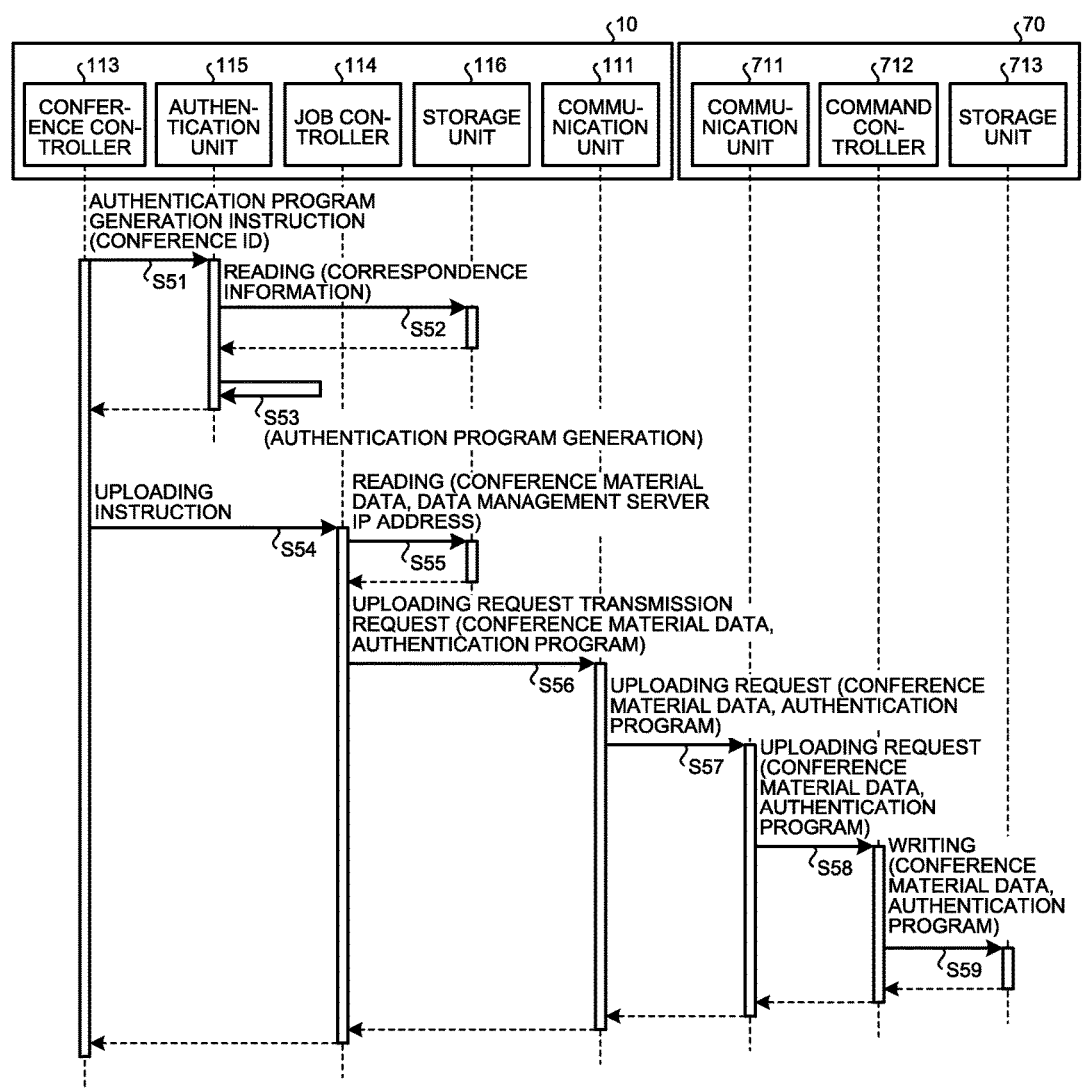
FIG. 15 is a sequence diagram illustrating an example of operation procedures of the system.

Thereafter, the information processing server 10 performs control to store (transfer) the conference material data in the data management server 70 (step S33). FIG. 15 is a sequence diagram illustrating an example of specific procedures at step S33. As illustrated in FIG. 15, the conference controller 113 specifies the conference ID contained in the storage request information received from the information terminal 30 and instructs the authentication unit 115 to generate an authentication program for authenticating the information terminals 30 (information terminals 30 that are identified by the user IDs and the Mac addresses) correlated with the specified conference ID (step S51). The authentication unit 115 that has received the instruction reads the above-mentioned correspondence information from the storage unit 116 (step S52), and generates the authentication program for executing the authentication processing of authenticating the user IDs and the Mac addresses correlated with the conference ID specified from the conference controller 113 with reference to the read correspondence information (step S53). In this example, the authentication unit 115 has a function of generating the authentication program for determining whether the conference material data stored in the data management server 70 can be transmitted to any of the information terminals 30 when the conference material data is transmitted to the information terminal 30 based on the correspondence information stored in the storage unit 116 (correspondence information storage unit) in accordance with the storage request received by the communication unit 111 (storage request receiver), and corresponds to an "authentication program generator". The authentication unit 115 generates the authentication program only when the user ID and the Mac address contained in the storage request information received by the communication unit 111 are authenticated.

The authentication program includes a table into which the conference ID and the pieces of information terminal identification information (the user IDs and the Mac addresses) in the correspondence information are written and an execution file for determining whether the information terminal 30 that has requested to acquire the conference material data can acquire the conference material data based on determination whether the information terminal identification information of the information terminal 30 has been written into the table. In this example, the storage unit 116 of the information processing server 10 stores therein a source code of an authentication program object.

Figure 16:
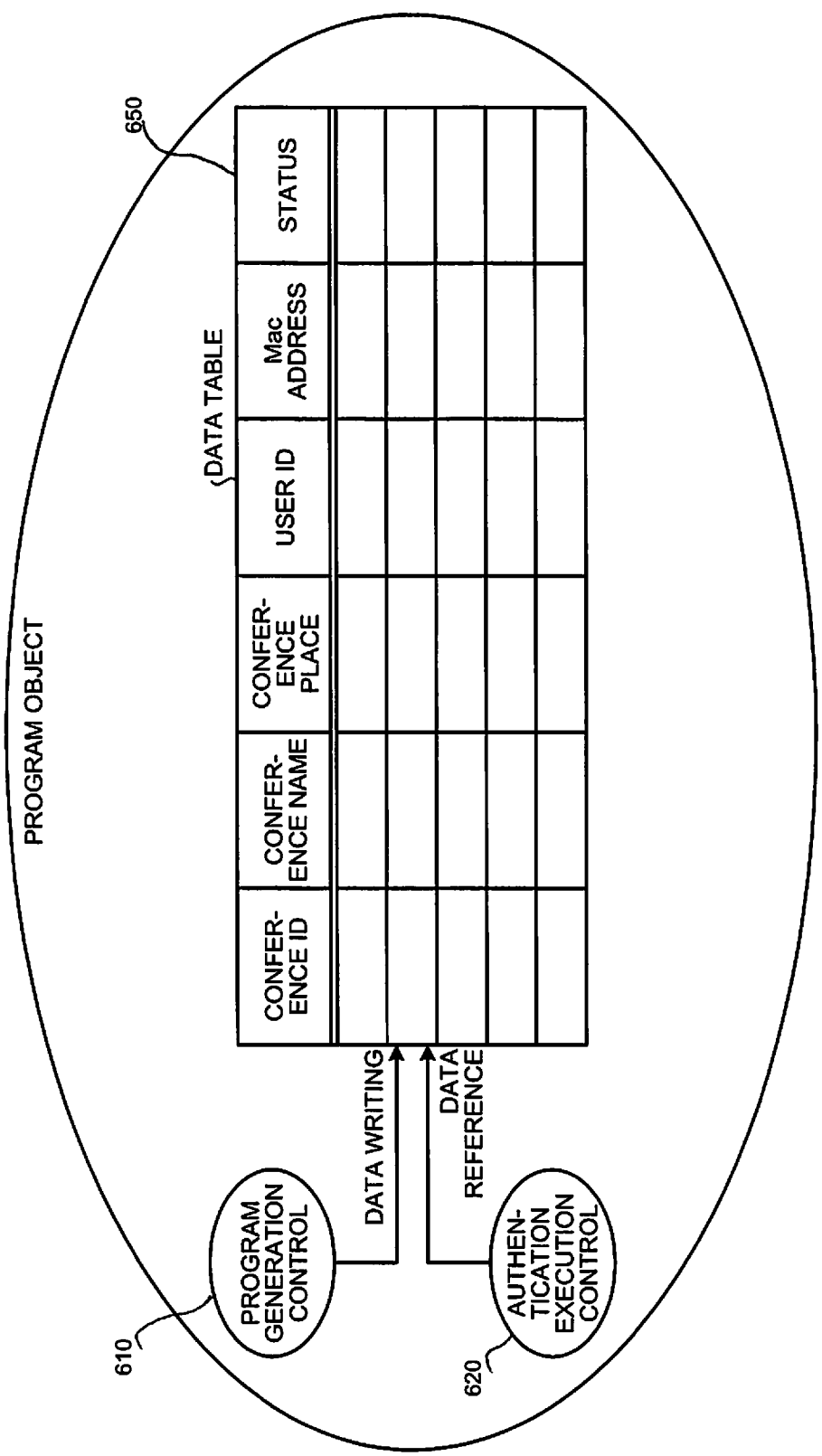
FIG. 16 is a diagram illustrating a source code of a program object of an authentication program.

As illustrated in FIG. 16, the source code includes program generation control 610, authentication execution control 620, and a data table 650 similar to the correspondence information illustrated in FIG. 4. When the conference controller 113 requests generation of the authentication program from the authentication unit 115, the authentication unit 115 extracts the source code from the storage unit 116 and compiles it and calls the program generation control. The called program generation control causes pieces of information to be written into the data table, thereby completing the program object. As will be described later, when the command controller 712 of the data management server 70 requests execution of the authentication program, the authentication execution control (corresponding to the execution file) is activated to cause information (as details will be described later, the user ID and the Mac address in this example) specified at the time of the execution of the authentication program and the pieces of information written into the data table to be compared. In this manner, the authentication processing is executed.

Figures 17, 18:
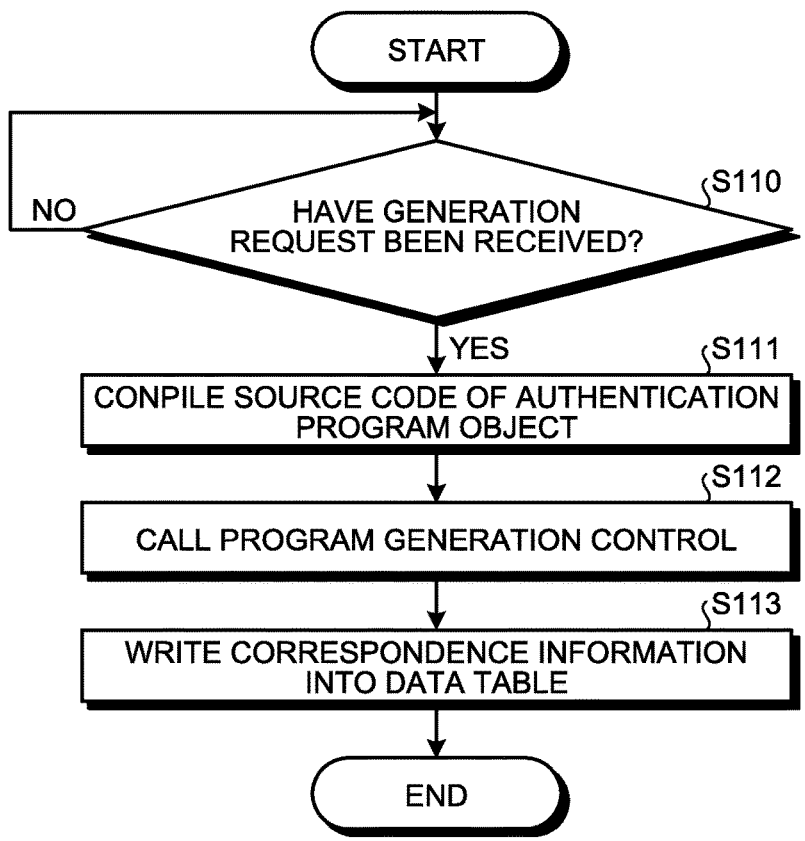
FIG. 17 is a flowchart illustrating an example of processing of generating the authentication program.
FIG. 18 is a diagram illustrating an example of information stored in a storage unit.

FIG. 17 is a flowchart illustrating an example of processing of generating the authentication program. As illustrated in FIG. 17, when the authentication unit 115 receives an authentication program generation request from the conference controller 113 (Yes at step S110), it extracts the source code of the authentication program object from the storage unit 116 and compiles it (step S111), and calls the program generation control (step S112). Then, the called program control causes pieces of information corresponding to the specified conference ID (conference ID contained in the above-mentioned storage request information) in the correspondence information illustrated in FIG. 4 to be written into the data table (step S113).

Description is continued with reference to FIG. 15 again. After the processing at step S53, the conference controller 113 specifies a folder path of the conference material data and the authentication program generated at step S53 and instructs the job controller 114 to store the conference material data stored in the specified folder path and the specified authentication program in the data management server 70 (step S54). The job controller 114 that has received the instruction reads the conference material data from the storage unit 116 using the specified folder path and reads the IP address of the data management server 70 (step S55). Then, the job controller 114 requests, from the communication unit 111, transmission of an upload request containing the conference material data read at step S55 and the authentication program specified by the conference controller 113 and requesting storage of a set of the conference material data and the authentication program to the data management server 70 specified by the ID address read at step S55 (step S56). The communication unit 111 that has received the request transmits the above-mentioned upload request to the data management server 70 (step S57). In this example, the conference controller 113 can be considered to have a function of storing the conference material data received by the communication unit 111 and the authentication program generated by the authentication unit 115 in the data management server 70 (data storage device) in a correlated manner, and corresponds to a "storage controller". Alternatively, it can be considered that, for example, at least one of the conference controllers 113 and the job controllers 114 corresponds to the "storage controller" or at least one of the conference controller 113, the job controller 114, and the communication unit 111 corresponds to the "storage controller". The conference controller 113 can also manage the authentication program generated by the authentication unit 115 and the conference ID (the conference ID contained in the above-mentioned storage request information) as a key of generation in a linked manner.

When the communication unit 711 of the data management server 70 receives the above-mentioned upload request from the information processing server 10, it transfers the received upload request to the command controller 712 (step S58). The command controller 712 performs control to store the conference material data and the authentication program contained in the upload request in the storage unit 713 in a correlated manner (store the set of the conference material data and the authentication program in the storage unit 713) (step S59). In this example, the storage unit 713 has a function of storing therein the set of the conference material data and the authentication program.

As illustrated in FIG. 18, for example, the storage unit 713 may store therein authentication program identification information (for example, the name of the authentication program) for identifying the authentication program and conference material data identification information (for example, the name of the conference material data) for identifying the conference material data for each identification number N assigned to each set in a linked manner. Substantial contents of the authentication program and the conference material data may also be stored together in the storage unit 713 (they may be stored in a linked manner to the corresponding pieces of identification information) or they may also be stored in another memory (they may be stored in a linked manner to the corresponding pieces of identification information). When the processing at step S59 is completed, the data management server 70 notifies the information processing server 10 of completion of the processing as a response to the upload request.

Description is continued with reference to FIG. 12 again. After the above-mentioned processing at step S33, the conference controller 113 instructs the job controller 114 to delete the conference material data temporarily stored in the storage unit 116 (step S34). The job controller 114 that has received the instruction performs control to delete the conference material data contained in the above-mentioned upload request from the storage unit 116 (step S35). In this example, the job controller 114 has a function of controlling to delete the conference material data temporarily stored in the storage unit 116 after the conference controller 113 (storage controller) performs control to store the conference material data and the authentication program in the data management server 70 in the correlated manner, and corresponds to a "deletion controller". Alternatively, it can be considered that, for example, at least one of the conference controllers 113 and the job controller 114 corresponds to the "deletion controller".

Figure 19:
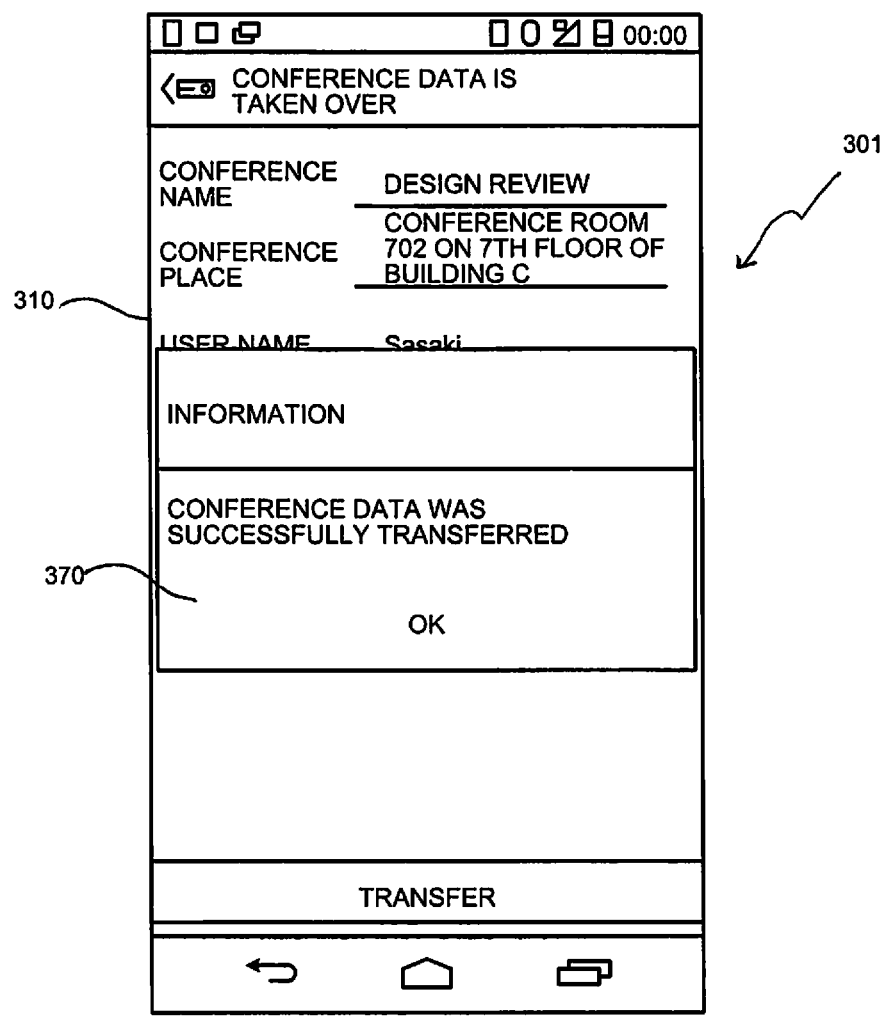
FIG. 19 is a diagram illustrating an example of the screen that is displayed on the operation unit.

When the above-mentioned pieces of processing are completed, the conference controller 113 transmits a processing result indicating completion of the processing of storing (transferring) the conference material data in the data management server 70 as a response to the above-mentioned storage request to the information terminal 30 of the conference organizer through the command controller 112 and the communication unit 111 (step S36 to step S38). When the communication unit 314 of the information terminal 30 receives the above-mentioned processing result as the response to the above-mentioned storage request from the information processing server 10, it transfers the received processing result to the job controller 312 (step S39). The job controller 312 instructs the input/output unit 311 to display the processing result received from the communication unit 314 (step S40). The input/output unit 311 that has received the instruction displays an operation screen 310 indicating the processing result 370, for example, as illustrated in FIG. 19 on the operation unit 301 (step S41).

Figure 20:
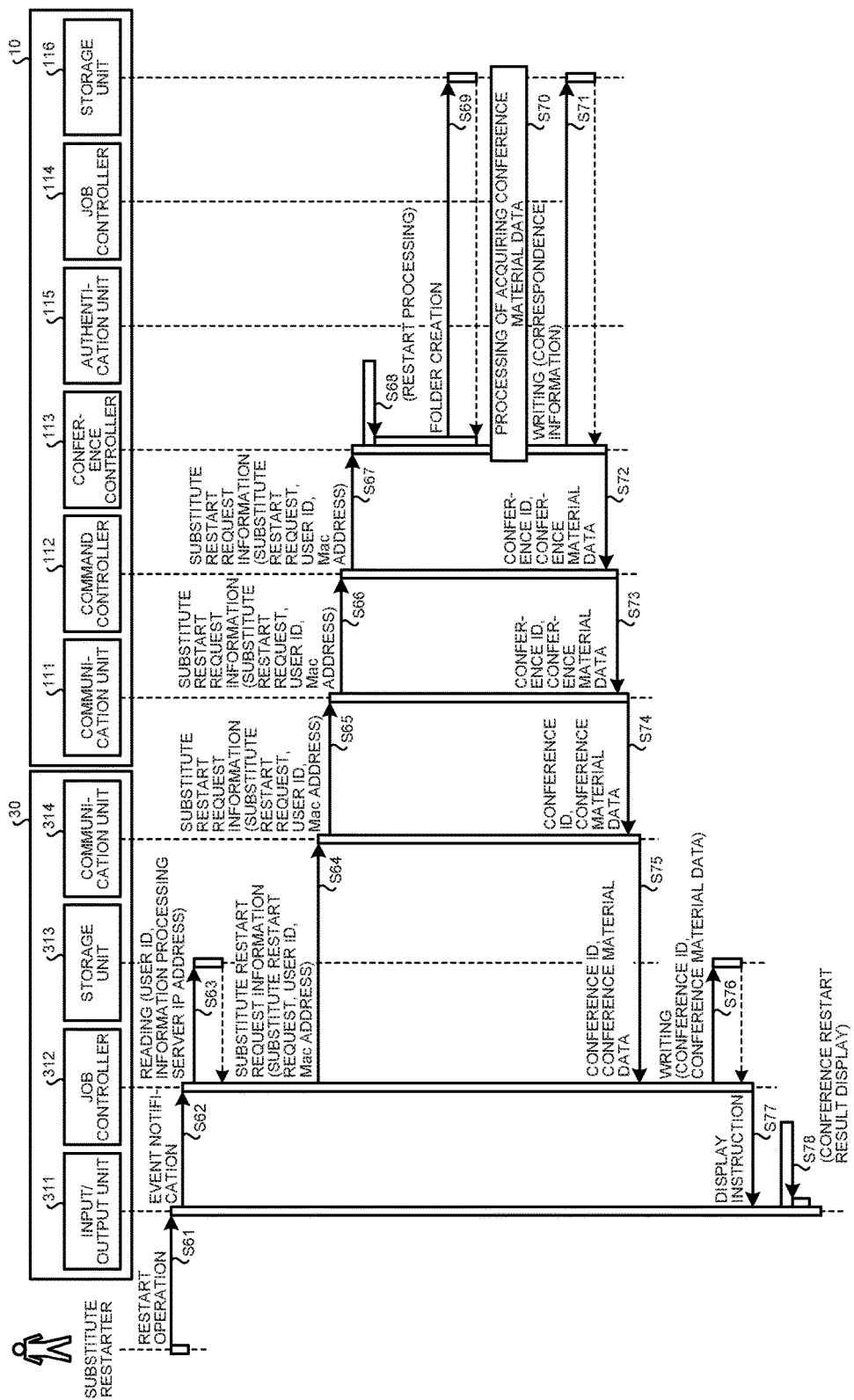
FIG. 20 is a sequence diagram illustrating an example of operation procedures of the system.

Next, operation procedures of the system 100 when the substitute organizer restarts the conference will be described with reference to FIG. 20 and FIG. 21. As illustrated in FIG. 20, first, the substitute organizer performs an operation of instructing the information terminal 30 that he (she) possesses to restart (substitutively restart) the conference (step S61). Although various modes can be considered as the operation, as an example, the operation may be an operation of pressing a display component indicating "substitutively restart conference" through an operation screen 310 of the operation unit 301 as illustrated in FIG. 22.

Description with reference to FIG. 20 is continued. The input/output unit 311 that has received the above-mentioned operation at step S61 notifies the job controller 312 of a substitute restart event indicating generation of an event triggering the substitute restart of the conference (step S62). The job controller 312 that has received the substitute restart event reads the user ID and the information processing server IP address stored in the storage unit 313 (step S63). Then, the job controller 312 requests, from the communication unit 314, transmission of the information terminal identification information (in this example, the user ID and the Mac address) and a substitute restart request requesting the substitute restart of the conference to the information processing server 10 specified by the information processing server IP address read at step S63 (step S64). In the following description, the information group is referred to as "substitute restart request information". The communication unit 314 that has received the request transmits the above-mentioned substitute restart request information to the information processing server 10 (step S65).

When the communication unit 111 of the information processing server 10 receives the above-mentioned substitute restart request information from the information terminal 30, it transfers the received substitute restart request information to the command controller 112 (step S66). In this example, the communication unit 111 has a function of receiving the information terminal identification information and the substitute restart request of the conference from any of the information terminals 30, and corresponds to a "substitute restart request receiver".

Then, the command controller 112 transfers the substitute restart request information transferred from the communication unit 111 to the conference controller 113 (step S67). To be more specific, the command controller 112 interprets the substitute restart request transferred from the communication unit 111, converts it to a control instruction in the information processing server 10, and transfers it to the conference controller 113. Subsequently, the conference controller 113 executes conference restart processing (step S68), and newly creates a folder for handling data for the conference in the storage unit 116 (step S69).

Then, the information processing server 10 performs processing of acquiring the conference material data from the data management server 70 (step S70). FIG. 21 is a sequence diagram illustrating an example of detailed procedures at step S70. As illustrated in FIG. 21, first, the conference controller 113 instructs the job controller 114 to acquire the conference material data from the data management server 70 (step S81). The job controller 114 that has received the instruction reads the IP address of the data management server 70 from the storage unit 116 (step S82). Then, the job controller 114 requests, from the communication unit 111, transmission of a conference material data request containing the user ID and the Mac address contained in the above-mentioned substitute restart request information and requesting the conference material data to the data management server 70 specified by the ID address read at step S82 (step S83). The communication unit 111 that has received the request transmits the above-mentioned conference material data request to the data management server 70 (step S84).

When the communication unit 711 of the data management server 70 receives the above-mentioned conference material data request from the information processing server 10, it transfers the received conference material data request to the command controller 712 (step S85). The command controller 712 reads the authentication program from the storage unit 713 (step S86) and executes the read authentication program to execute authentication processing of authenticating the user ID and the Mac address contained in the conference material data request (step S87). To be more specific, when the user ID and the Mac address contained in the conference material data request is present among the sets of the user IDs and the Mac addresses written into the table of the authentication program (information of an authentication source), the user ID and the Mac address contained in the conference material data request is authenticated (they are deemed to have right authority to acquire the conference material data). For the convenience of description, hereinafter, it is supposed that a result of the authentication processing at step S87 is positive. In this example, the information processing server 10 (the job controller 114 or the combination of the conference controller 113 and the job controller 114) can be considered to have a function (authentication program execution unit) of causing the authentication program stored in the data management server 70 to execute processing of determining whether the conference material data stored in the correlated manner with the authentication program can be transmitted to the information terminal 30 that has requested the conference substitute restart, based on the information terminal identification information (in this example, the user ID and the Mac address) received by the substitute restart request receiver (communication unit 111). In this example, the authentication program execution unit causes all of the authentication programs stored in the data management server 70 to execute the processing.

When the above-mentioned authentication processing is completed, the command controller 712 reads the conference material data forming the set with the authentication program used for the authentication processing from the storage unit 713 (step S88) and requests transmission of the read conference material data from the communication unit 711 (step S90). The communication unit 711 that has received the request transmits the conference material data as a response to the conference material data request to the information processing server 10 (step S91). In this example, the communication unit 711 has a function of transmitting the conference material data forming the set with the authentication program used for authentication of the user ID as the response to the conference material data request when the user ID (information terminal identification information) contained in the above-mentioned conference material data request is authenticated.

Figure 23:
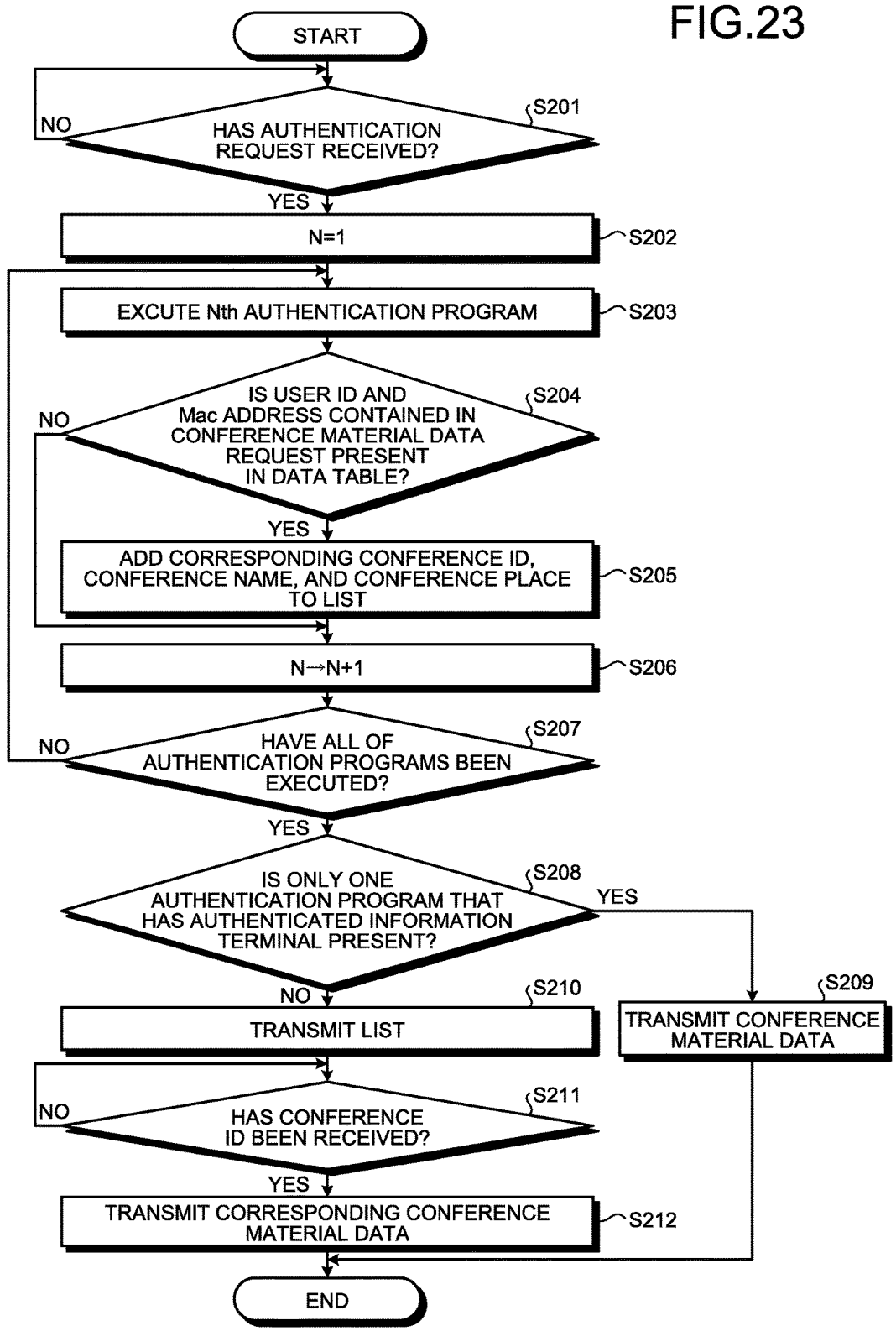
FIG. 23 is a flowchart illustrating an example of operations of the data management server.

FIG. 23 is a flowchart illustrating an example of operations of the data management server 70 when the authentication program is executed. As illustrated in FIG. 23, when the command controller 712 receives an authentication request (in this example, the conference material data request corresponds to the authentication request) (Yes at step S201), it sets the above-mentioned identification number N to "1" (step S202). Then, the command controller 712 executes the authentication program (Nth authentication program) corresponding to the identification number N (step S203), and calls the authentication execution control. The called authentication execution control performs the authentication processing of determining whether the user ID and the Mac address contained in the conference material data request is present in the above-mentioned data table (step S204). When a result at step S204 is positive (Yes at step S204), the command controller 712 adds the conference ID, the conference name, and the conference place linked to the user ID and the Mac address contained in the conference material data request in the above-mentioned data table to a list (step S205), and increments the identification number N by "1" (step S206). On the other hand, when the result at step S204 is negative (No at step S204), the processing shifts to step S206.

Then, the command controller 712 determines whether all of the authentication programs have been executed (step S207). When a result at step S207 is negative (No at step S207), the above-mentioned pieces of processing at step S203 and subsequent steps are repeated. When the result at step S207 is positive (Yes at step S207), the command controller 712 checks whether the authentication program that has authenticated the information terminal 30 (that has authenticated the user ID and the Mac address contained in the conference material data request) is only one (step S208).

When the result at step S208 is positive (Yes at step S208), the command controller 712 transmits the conference material data corresponding to the user ID and the Mac address that have been authenticated to the information processing server 10 (step S209). When the result at step S208 is negative (No at step S208), the above-mentioned list is transmitted to the information processing server 10 (step S210). In this example, when the job controller 114 of the information processing server 10 receives the above-mentioned list as a response to the conference material data request from the data management server 70, it transmits a restart conference selection screen 380 (FIG. 24) for selecting a conference to be restarted among a plurality of conferences described in the above-mentioned list to the information terminal 30 and a user (substitute organizer) of the information terminal 30 can perform an operation of selecting any of the conferences. The information processing server 10 transmits the conference ID of the conference selected by the user to the data management server 70 in accordance with the selection operation. It should be noted that not only the conference ID but also pieces of information such as the conference name and the conference place may be also transmitted together. In this example, the command controller 712 of the data management server 70 receives the conference ID of any of the conferences (the conference as a restart target selected by the user) as a response to the above-mentioned list from the information processing server 10.

After the above-mentioned processing at step S210, the command controller 712 of the data management server 70 checks whether the conference ID has been received from the information processing server 10 (step S211). When a result at step S211 is positive (Yes at step S211), the command controller 712 transmits only the conference material data corresponding to the received conference ID to the information processing server 10 (step S212).

As will be described later, the conference material data that the data management server 70 has transmitted is transmitted to the information terminal 30 through the information processing server 10. The command controller 712 can therefore be considered to have a function (function of a data transmitter) of transmitting the conference material data to the information terminal 30 when the authentication program has authenticated transmission of the conference material data to the information terminal 30. As described above, the command controller 712 (data transmitter) has a function of transmitting the list of the corresponding conference IDs to the information terminal 30 and transmitting only the conference material data corresponding to the conference ID selected from the list to the information terminal 30 when there are a plurality of pieces of conference material data that have been authenticated to be transmitted to the information terminal 30.

Figure 21:
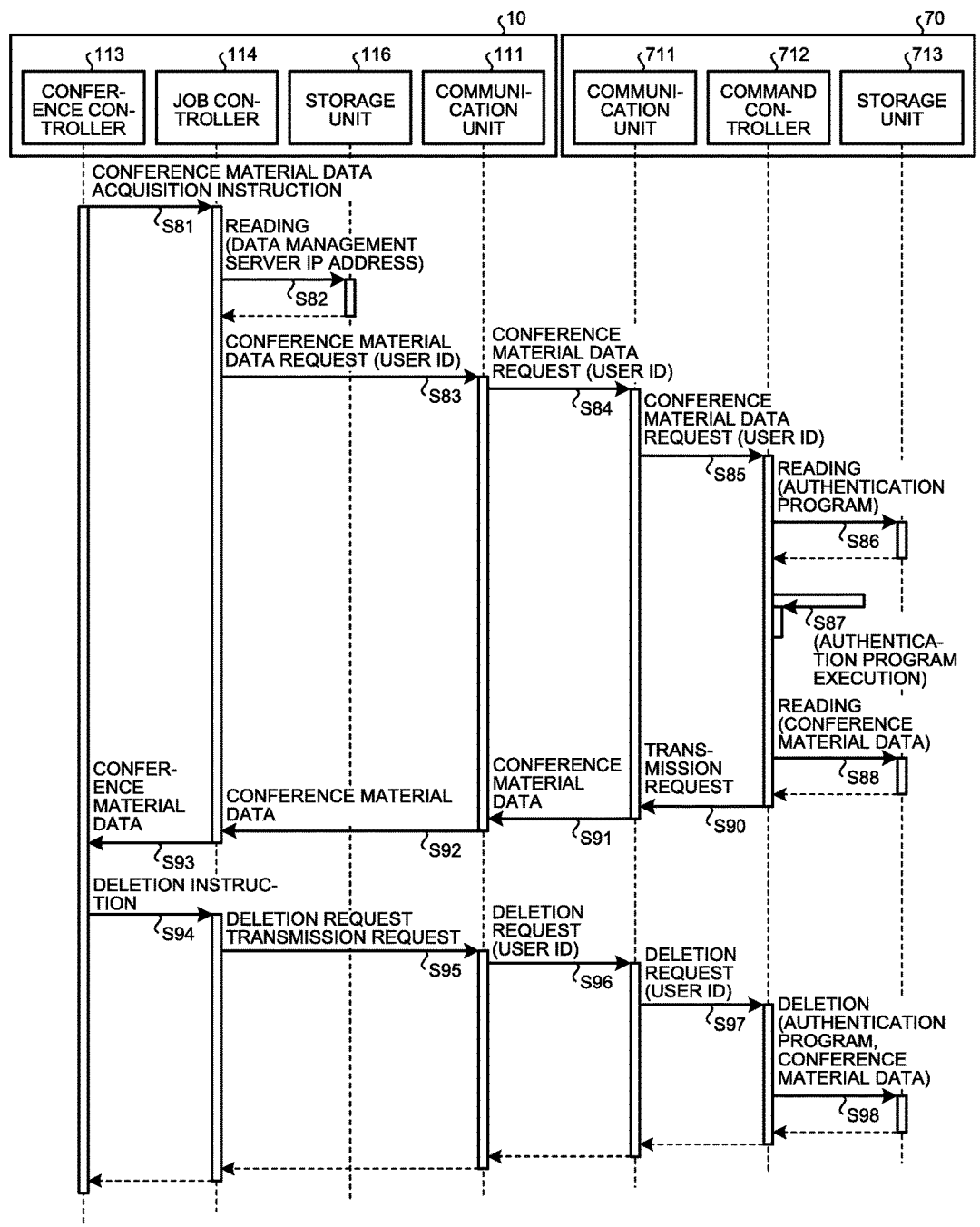
FIG. 21 is a sequence diagram illustrating another example of operation procedures of the system.
Figure 22:
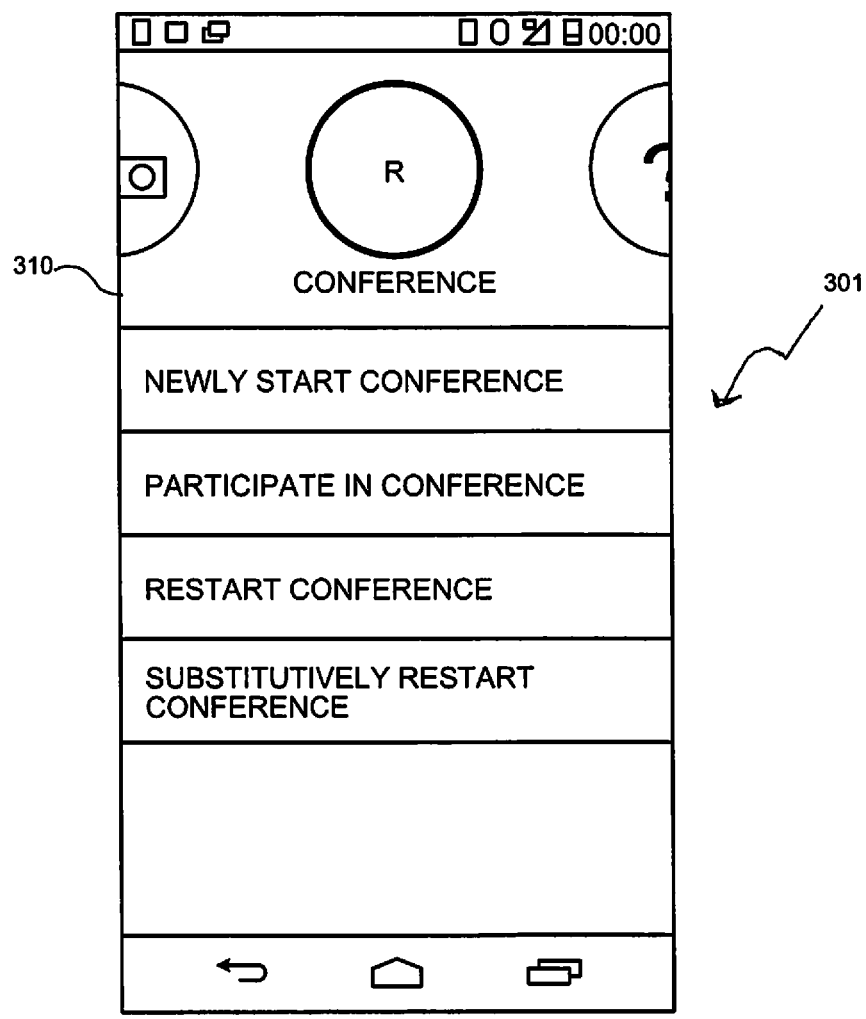
FIG. 22 is a diagram illustrating an example of the screen that is displayed on the operation unit.

Description with reference to FIG. 21 is continued. After the processing at step S91, when the communication unit 111 of the information processing server 10 receives the conference material data from the data management server 70, it transfers the received conference material data to the conference controller 113 through the job controller 114 (step S92, step S93). In this example, the communication unit 111 has a function of receiving the conference material data from the data management server 70 only when the user ID and the Mac address (information terminal identification information) contained in the conference material data request have been authenticated with the authentication processing using the above-mentioned authentication program.

Description with reference to FIG. 21 is continued. The conference controller 113 that has received the conference material data from the data management server 70 instructs the job controller 114 to delete the set of the conference material data and the authentication program from the data management server 70 (step S94). The job controller 114 that has received the instruction requests, from the communication unit 111, transmission of a deletion request requesting deletion of the conference material data received as the response to the above-mentioned conference material data request and the authentication program forming the set with the conference material data to the data management server 70 (step S95). The above-mentioned deletion request may contain the user ID that is the same as the user ID contained in the above-mentioned conference material data request, may contain information specifying the conference material data as a deletion target, or may contain a combination thereof. In summary, it is sufficient that the deletion request contains information enabling the data management server 70 to specify the conference material data as the deletion target. The communication unit 111 that has received the request transmits the above-mentioned deletion request to the data management server 70 (step S96). In this example, the communication unit 111 has a function of transmitting the deletion request requesting deletion of the set of the conference material data and the authentication program to the data management server 70 (data storage device) when the communication unit 111 receives the conference material data from the data management server 70 as the response to the above-mentioned conference material data request.

When the communication unit 711 of the data management server 70 receives the above-mentioned deletion request from the information processing server 10, it transfers the received deletion request to the command controller 712 (step S97). In this example, the communication unit 711 has a function of receiving the above-mentioned deletion request. The command controller 712 performs control to delete the conference material data and the authentication program forming the set with the conference material data that have been requested to be deleted from the storage unit 713 (step S98). In this example, the command controller 712 has a function of controlling to delete the set stored in the storage unit 713 in accordance with the above-mentioned deletion request. That is to say, the command controller 712 has a function (function of a deletion unit) of deleting the conference material data that is transmitted to the information terminal 30 from the data management server 70. When the processing at step S98 is completed, the data management server 70 notifies the information processing server 10 of completion of the processing as a response to the deletion request. The specific procedures of the processing at step S70 illustrated in FIG. 17 are described above.

Figures 24, 25:
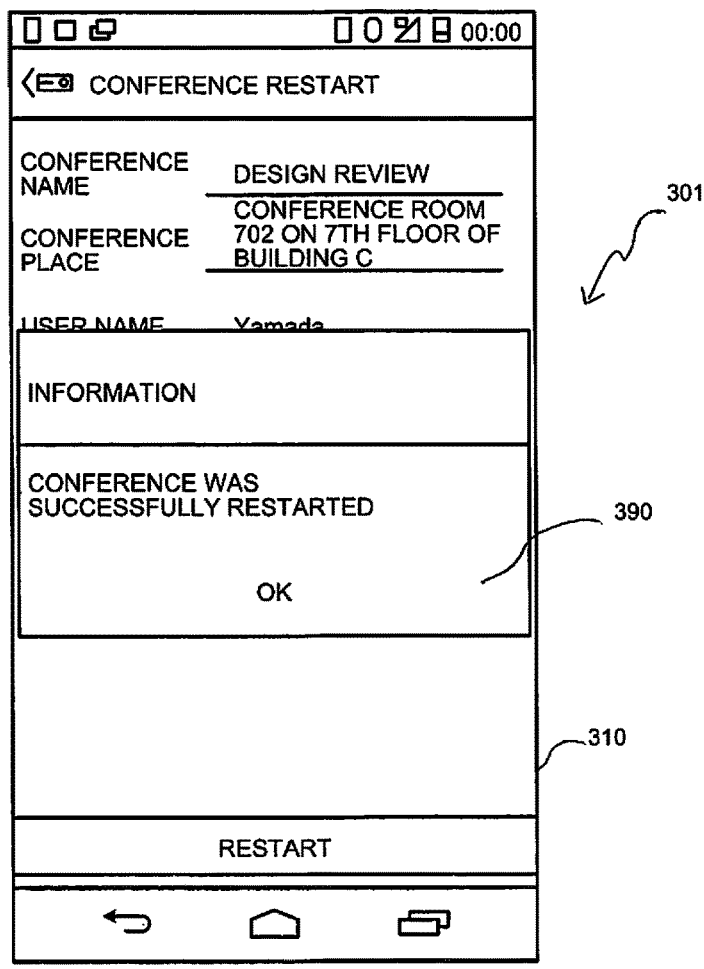
FIG. 24 is a diagram illustrating an example of a restart conference selection screen.
FIG. 25 is a diagram illustrating an example of the screen that is displayed on the operation unit.

Description is continued with reference to FIG. 20 again. After the processing at step S70, the conference controller 113 performs control to change the status corresponding to the conference ID of the conference that is restarted to "in conference" from "in interruption" and store the conference material data received from the data management server 70 in a conference folder (step S71). Then, the conference controller 113 performs control to transmit the conference ID and the conference material data of the conference that is restarted to the information terminal 30 through the command controller 112 and the communication unit 111 (step S72 to step S74). When the communication unit 314 of the information terminal 30 receives the conference ID and the conference material data of the conference that is restarted as a response to the above-mentioned substitute restart request from the information processing server 10, it transfers the received conference ID and conference material data to the job controller 312 (step S75). The job controller 312 performs control to store the conference ID and the conference material data received from the communication unit 314 in the storage unit 313 (step S76). Then, the job controller 312 instructs the input/output unit 311 to display a conference restart result indicating success of the restart of the conference (step S77). The input/output unit 311 that has received this instruction displays an operation screen 310 indicating the conference restart result 390 as illustrated in FIG. 25 on the operation unit 301 (step S78).

As described above, in the embodiment, when the conference ID, the user ID, the Mac address, the conference material data, and the storage request requesting storage of the conference material data in the data management server 70 are received from any of the information terminals 30 (the information terminal 30 of the conference organizer), the authentication program for determining whether the conference material data stored in the data management server 70 can be transmitted to any of the information terminals 30 when the conference material data is transmitted to the information terminal 30 is generated based on the above-mentioned correspondence information, in accordance with the storage request, and the generated authentication program and the conference material data received from the information terminal 30 are stored in the data management server 70 in a correlated manner. With this configuration, the conference material data stored in the data management server 70 can be downloaded under a condition of authentication with the authentication program even when the conference is restarted using the information terminal 30 of the conference participant other than the conference organizer. Accordingly, the conference material data that is managed by the conference organizer can be taken over to another conference participant while sufficiently ensuring security even when the conference organizer becomes incapable of participating in the conference for a sudden reason such as a poor physical condition and a traffic situation.

The programs that are executed by the system 100 (the information processing server 10, the information terminal 30, the data management server 70, and the like) in the above-mentioned embodiment may be recorded and provided in a computer-readable recording medium such as a compact disc read only memory (CD-ROM), a flexible disk (FD), a compact disc recordable (CD-R), a digital versatile disc (DVD), and a universal serial bus (USB), as an installable or executable file, or may be provided or distributed via a network such as the Internet. The various programs may be embedded and provided in a ROM, for example.

According to the exemplary embodiments of the present invention, the conference material data that the conference organizer manages can be taken over to another conference participant while sufficiently ensuring security.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A system including a plurality of information terminals, an information processing apparatus, and a data storage device, connectable through a network, the system comprising:
    a correspondence information memory storage configured to store correspondence information, including a plurality of pieces of information terminal identification information for identifying the information terminals corresponding to a plurality of users participating in conferences in a one-to-one manner, at least correlated with respective pieces of conference identification information for identifying the conferences;
    a storage request receiver configured to receive, from any of the plurality of information terminals, the respective pieces of conference identification information, the plurality of pieces of information terminal identification information, conference material data to be used for a conference, and a storage request requesting storage of the conference material data in the data storage device;
    at least one processor
        configured to generate an authentication program for determining whether the conference material data stored in the data storage device is transmittable to any of the plurality of information terminals when the conference material data is transmitted to the information terminal, based on the correspondence information stored in the correspondence information memory storage in accordance with the storage request received by the storage request receiver and
        configured to store the conference material data received by the storage request receiver and the authentication program generated, in the data storage device in a correlated manner;
    a substitute restart request receiver configured to receive the plurality of pieces of information terminal identification information and a conference substitute restart request from any of the plurality of information terminals,
    the at least one processor further being configured to cause the authentication program stored in the data storage device to execute processing of determining whether the conference material data stored in the correlated manner with the authentication program is transmittable to the information terminal requesting conference substitute restart, based on the plurality of pieces of information terminal identification information received by the substitute restart request receiver; and
    a data transmitter configured to transmit the conference material data to the information terminal upon the authentication program authenticating transmission of the conference material data to the information terminal,
    the at least one processor further being configured to
        delete the conference material data that the data transmitter has transmitted to the information terminal from the data storage device, and
        cause all of the authentication programs stored in the data storage device to execute processing, and wherein
    the data transmitter is configured to transmit a list of respective pieces of corresponding conference identification information to the information terminal and is configured to transmit only the conference material data corresponding to the respective pieces of conference identification information selected from the list to the information terminal upon there being a plurality of pieces of the conference material data, that have been authenticated, to be transmitted to the information terminal.

2. The system according to claim 1, further comprising:
a conference material memory data storage configured to temporarily store therein the conference material data received by the storage request receiver; and
wherein the at least one processor is further configured to perform control to delete the conference material data stored in the conference material memory data storage unit after the at least one processor performs control to store the conference material data and the authentication program in the data storage device in the correlated manner.

3. The system according to claim 1,
wherein the at least one processor is further configured to authenticate the plurality of pieces of information terminal identification information upon a combination of the respective pieces of conference identification information and the plurality of pieces of information terminal identification information received by the storage request receiver being present in the correspondence information, wherein
the at least one processor is further configured to generate the authentication program upon the at least one processor authenticating the plurality of pieces of information terminal identification information.

4. The system according to claim 1, wherein
the authentication program includes a table into which the respective pieces of conference identification information and the plurality of pieces of information terminal identification information in the correspondence information are written and an execution file for determining whether the information terminal requesting to acquire the conference material data is capable of acquiring the conference material data based on determination of whether the plurality of pieces of information terminal identification information of the information terminal has been written into the table.

5. An information processing apparatus, connectable to a plurality of information terminals and a data storage device through a network, the information processing apparatus comprising:
a storage request receiver configured to receive, from any of the plurality of information terminals, conference identification information for identifying a conference, information terminal identification information for identifying an information terminal that a user participating in the conference possesses, conference material data to be used for the conference, and a storage request requesting storage of the conference material data in the data storage device;
at least one processor
configured to generate an authentication program for determining whether the conference material data stored in the data storage device is transmittable to any of the plurality of information terminals when the conference material data is transmitted to the information terminal, based on correspondence information in which pieces of the information terminal identification information are at least correlated with respective pieces of conference identification information, in accordance with the storage request received by the storage request receiver and configured to store the conference material data contained in the storage request received by the storage request receiver and the authentication program generated, in the data storage device in a correlated manner;
a substitute restart request receiver configured to receive the pieces of the information terminal identification information and a conference substitute restart request from any of the plurality of information terminals;
the at least one processor further being configured to cause the authentication program stored in the data storage device to execute processing of determining whether the conference material data stored in the correlated manner with the authentication program is transmittable to the information terminal requesting conference substitute restart, based on the pieces of information terminal identification information received by the substitute restart request receiver; and
a data transmitter configured to transmit the conference material data to the information terminal upon the authentication program authenticating transmission of the conference material data to the information terminal;
the at least one processor further being configured to
delete the conference material data that the data transmitter has transmitted to the information terminal from the data storage device, and
cause all of the authentication programs stored in the data storage device to execute processing, and wherein
the data transmitter is configured to transmit a list of respective pieces of corresponding conference identification information to the information terminal and is configured to transmit only the conference material data corresponding to the respective pieces of conference identification information selected from the list to the information terminal upon there being a plurality of pieces of the conference material data, that have been authenticated, to be transmitted to the information terminal.

6. An information processing method by a system including a plurality of information terminals, an information processing apparatus, and a data storage device, connectable through a network, the information processing method comprising:
receiving, from any of the plurality of information terminals, conference identification information for identifying a conference, information terminal identification information for identifying an information terminal that a user participating in the conference possesses, conference material data to be used for the conference, and a storage request requesting storage of the conference material data in the data storage device;
generating an authentication program for determining whether the conference material data stored in the data storage device is transmittable to any of the plurality of information terminals when the conference material data is transmitted to the information terminal, based on correspondence information in which pieces of the information terminal identification information are at least correlated with respective pieces of conference identification information, in accordance with the storage request received at the receiving;
storing the conference material data received at the receiving and the authentication program generated at the generating in the data storage device in a correlated manner;
receiving the pieces of the information terminal identification information and a conference substitute restart request from any of the plurality of information terminals;
causing the authentication program stored in the data storage device to execute processing of determining whether the conference material data stored in the correlated manner with the authentication program is transmittable to the information terminal requesting conference substitute restart, based on the pieces of information terminal identification information received in the receiving;
transmitting the conference material data to the information terminal upon the causing determining the authentication program authenticate transmission of the conference material data to the information terminal; and deleting the conference material data, transmitted to the information terminal during the transmitting, from the data storage device, wherein
the causing causes all of the authentication programs stored in the data storage device to execute processing, and
the transmitting includes transmitting a list of respective pieces of corresponding conference identification information to the information terminal transmitting only the conference material data corresponding to the respective pieces of conference identification information selected from the list to the information terminal upon there being a plurality of pieces of the conference material data, that have been authenticated, to be transmitted to the information terminal.

* * * * *